(12) United States Patent
Itou et al.

(10) Patent No.: US 6,788,370 B2
(45) Date of Patent: Sep. 7, 2004

(54) LIQUID CRYSTAL DISPLAY APPARATUS

(75) Inventors: Osamu Itou, Hitachi (JP); Shinichi Komura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 130 days.

(21) Appl. No.: 09/940,810

(22) Filed: Aug. 29, 2001

(65) Prior Publication Data

US 2002/0118323 A1 Aug. 29, 2002

(30) Foreign Application Priority Data

Feb. 28, 2001 (JP) ........................................ 2001-054979

(51) Int. Cl.⁷ ............................................ G02F 1/1335
(52) U.S. Cl. ...................... 349/117; 349/96; 349/119; 349/143; 349/147; 257/59
(58) Field of Search ................... 349/117, 119, 349/96, 143, 147; 257/59

(56) References Cited

U.S. PATENT DOCUMENTS

| | | | | |
|---|---|---|---|---|
| 4,906,073 A | * | 3/1990 | Hunahata et al. | 350/347 |
| 6,295,109 B1 | * | 9/2001 | Kubo et al. | 349/119 |
| 6,476,893 B1 | * | 11/2002 | Sasaki et al. | 349/119 |
| 6,552,767 B1 | * | 4/2003 | Kaneko | 349/119 |
| 2001/0004296 A1 | * | 6/2001 | Van Aerle et al. | 359/254 |
| 2001/0024257 A1 | * | 9/2001 | Kubo et al. | 349/138 |
| 2001/0040658 A1 | * | 11/2001 | Nemoto et al. | 349/113 |
| 2002/0093620 A1 | * | 7/2002 | Itou et al. | 349/179 |
| 2003/0067570 A1 | * | 4/2003 | Okamoto et al. | 349/113 |

FOREIGN PATENT DOCUMENTS

| | | | |
|---|---|---|---|
| EP | 996026 | * | 4/2000 |
| JP | 2000-19010 | * | 1/2000 |
| JP | 2000-29010 | * | 1/2000 |
| JP | 2000-206333 | * | 7/2000 |

OTHER PUBLICATIONS

P-74: Development of Reflective Color STN-LCD Using A New Optimizing Method of Retarders and A Polarizer; O. Itou, et al, SID 98 Digest, pp. 766-769.

35.1, Optical Properties of Retardation Films for STN-LCDs, Yasuo Fujimura, et al, SID 91 Digest, pp. 739-742, Nitto Denko Corporation, Toyohashi, Japan.

Theory of the Optical Properties of Non-Absorbing Compensated Cholesteric Liquid Crystals, S. Chandrasekhar, et al, Molecular Crystals and Liquid Crystals, 1973, vol. 24, pp. 201-211 Copyright 1974 Gordon and Breach Science Publishers Printed in Great Britain.

* cited by examiner

*Primary Examiner*—Nathan J. Flynn
*Assistant Examiner*—Ahmed N. Sefer
(74) *Attorney, Agent, or Firm*—Antonelli, Terry, Stout & Kraus, LLP

(57) ABSTRACT

The liquid crystal display apparatus includes a liquid crystal layer 10 and a liquid crystal driving unit 19 which are held in being sandwiched between a pair of opposed boards 11, 12, and polarization plates 33, 34 and phase plates 31, 32 which are located on the upper side and on the lower side, respectively. Moreover, a pixel of the liquid crystal display apparatus includes the reflection display unit whose reflectivity's applied voltage characteristic is the normally-closed type and the transmission display unit whose layer thickness is thicker than that of a liquid crystal layer constituting the reflection display unit. Furthermore, the polarization plate 34 and the phase plate 32 located on the lower side of the opposed boards form an elliptical polarization plate, thereby converting, into a circularly-polarized light, a backlight light at a point-in-time of having passed through a liquid crystal layer's portion corresponding to a difference in the layer thickness between the liquid crystal layers.

13 Claims, 12 Drawing Sheets

25:DEPRESSION-AND-PROJECTION-FORMED LAYER

LIQUID CRYSTAL DISPLAY APPARATUS

BACKGROUND OF THE INVENTION

1. Field of the Invention

The present invention relates to a liquid crystal display apparatus, and more particularly to a liquid crystal display apparatus including a reflection display unit and a transmission display unit within one pixel.

2. Description of the Prior Art

One type of the reflection-type liquid crystal display apparatuses has a reflection display unit and a transmission display unit within one pixel. The reflection display unit performs the display by reflecting, using a reflection plate, the light incoming from the surroundings. Since the reflection display unit has a fixed contrast ratio independently of the brightness of the surroundings, it offers an advantage of making it possible to obtain an excellent display under an environment ranging from outdoors to indoors at the time of sunny weather. The reflection display unit, however, becomes incapable of recognizing the display in a dark environment such as a dark room.

Meanwhile, the transmission display unit performs the display by taking advantage of the light from a backlight light-source located at the rear thereof. The transmission display unit offers an advantage of making it possible to recognize the display even in the dark environment such as the dark room. The transmission display unit, however, becomes incapable of recognizing the display under a bright environment where, e.g., the intensity of the interfacial reflection light is stronger than that of the backlight light.

In this way, the reflection display unit and the transmission display unit are in a relationship of complementing the respective disadvantages to each other. As a result, the reflection-type liquid crystal display apparatus including both of them is usable under a wider condition including the outdoors at the time of sunny weather to the dark room. The reflection-type liquid crystal display apparatus including the reflection display unit and the transmission display unit within one pixel has been described in, e.g., JP-A-11-242226.

In the reflection-type liquid crystal display apparatus including the reflection display unit and the transmission display unit (hereinafter, referred to as simply "the reflection-type liquid crystal display apparatus"), the reflection display unit has built the reflection plate in a liquid crystal cell, and includes one sheet of polarizer and one sheet or two sheets of phase plates. Meanwhile, the transmission display unit in the reflection-type liquid crystal display apparatus uses one sheet of polarizer over and under a liquid crystal cell, and includes one sheet or two sheets of phase plates between the liquid crystal cell and the polarizers.

The display characteristics of the reflection display unit are determined by the respective optical parameters of the liquid crystal layer, the phase plates, and the polarizers. The optical parameters of the liquid crystal layer are a twist angle and a retardation. The optical parameters of the phase plates are the azimuthal angle of a slow axis and a retardation. The optical parameter of the polarizers is the azimuth-angle of an absorption axis.

Similarly, the display characteristics of the transmission display unit are also determined by the optical parameters of the liquid crystal layer, the phase plates, and the polarization plates.

On the upper side of the reflection-type liquid crystal display apparatus (i.e., on an observation-plane side of the liquid crystal display apparatus), the phase plate and the polarizer located thereon can be used in common to the reflection display unit and the transmission display unit. On the other hand, on the lower side of the reflection-type liquid crystal display apparatus, it is difficult to form, as one and the same layer, a reflection electrode for applying a voltage to the reflection display unit and a transparent electrode for applying a voltage to the transmission display unit. Accordingly, both of the electrodes are usually formed as different layers. This condition results in a difference in the liquid crystal layer thickness between the reflection display unit and the transmission display unit, thereby making it impossible to obtain excellent displays on both the reflection display and the transmission display.

On account of this, in a reflection-type liquid crystal display apparatus using, e.g., a super-twisted nematic liquid crystal, the margin for a variation in the liquid crystal layer thickness is extremely narrow. Consequently, a configuration has been employed where layer-gap between the reflection display unit and the transmission display unit is eliminated. In this apparatus, however, the combination of a lower-side phase plate and a lower-side polarizer has been formed into an elliptical polarizer in order to increase the transmission of the transmission display unit. In this case, in spite of the condition that there exists no layer-gap between the reflection display unit and the transmission display unit, the combination has been formed into the elliptical polarization plate. This reduces the contrast ratio on the transmission display down to an order of 10:1.

SUMMARY OF THE INVENTION

The present invention has been made in view of these problems, and provides a reflection-type liquid crystal display apparatus that allows the excellent displays to be obtained on both the reflection display and the transmission display.

In order to solve the above-described problems, the present invention has employed the following method:

In a liquid crystal display apparatus including a pair of facing substrates, a liquid crystal layer and a liquid crystal driving unit which are held in being sandwiched between the facing substrates, and polarization plates and phase plates which are located on the upper side and on the lower side of the facing substrates, respectively, wherein a pixel of the liquid crystal display apparatus includes a reflection display unit whose reflectivity's applied voltage dependance of reflection is the normally-closed type and a transmission display unit whose layer thickness is thicker than that of a liquid crystal layer constituting the reflection display unit. Moreover, the polarization plate and the phase plate which are located on the lower side of the facing substrates form an elliptical polarizer, thereby converting, into a circularly-polarized light, a backlight light at a point-in-time of having passed through a liquid crystal layer's portion corresponding to a difference in the layer thickness between the liquid crystal layers.

An optical parameter setting method for the liquid crystal layer, the phase plates, and the polarizer of the reflection-type liquid crystal display apparatus has been described in, e.g., a presentation given by O. Itou, S. Komura, K. Kuwabara, K. Funahata, K. Kondo, K. Kubo et al. (SID '98 DIGEST (1998), pp. 766–769). In the reflection-type liquid crystal display apparatus, a light is incident into the polarizer, and passes through the phase plate and the liquid crystal layer, then being reflected by the reflection plate. Moreover, the light passes through the liquid crystal layer and the phase plate again, then being incident into the polarizer. At the time of the dark display, if, in this process, a phase difference equivalent to a half wavelength is added to the light, the light is completely absorbed at a point-in-time of being incident into the polarizer at the second time, which, accordingly, is ideal. Namely, this is because the oscillation plane of the light that has become a linearly-polarized light by passing through the polarizer at the first time rotates by 90° in this process, and thus the oscillation direction becomes parallel to an absorption axis of the polarizer at the point-in-time of being incident into the polarizer at the second time. When performing the conversion into the one-way light path, the phase difference added to the transmission light is equal to a quarter wavelength. Accordingly, at a point-in-time of having reached the reflection plate, the polarization state of the transmission light becomes a circularly-polarized light.

Also, at the time of the bright display, if a phase difference equivalent to the one wavelength is added to the light, the light passes through completely at the point-in-time of being incident into the polarizer at the second time, which, accordingly, is ideal. Namely, this is because, at this time, the oscillation plane of the light that has become the linearly-polarized light in passing through the polarizer at the first time does not rotate, and thus the oscillation direction becomes perpendicular to the absorption axis of the polarization at the point-in-time of being incident into the polarization at the second time. When performing the conversion into the one-way light path, the phase difference added to the transmission light is equal to a half wavelength. Accordingly, at the point-in-time of having reached the reflection plate, the polarization state of the transmission light becomes a linearly-polarized light.

FIG. 1 and FIG. 2 illustrate the above-described situation, using the Poincaré sphere display. Incidentally, the Poincaré sphere is a sphere that is 1 in radius and is defined within a space the three axes of which are Stokes parameters S1, S2, and S3. As illustrated in FIG. 17, the respective points on the sphere are in a one-to-one correspondence with all the polarization states. On the Poincaré sphere display, e.g., a sectional line with the (S1, S2) plane corresponds to a linearly-polarized light, and an intersection point with the S3 axis corresponds to a circularly-polarized light. The other portions correspond to elliptically-polarized lights.

FIG. 1 illustrates the ideal polarization conversion on the dark display. The explanation will be given below concerning FIG. 1. The transmission light after having passed through the polarizer has become the linearly-polarized light, thus being positioned at a point L1 on the equator on the Poincaré sphere. Then, the transmission light, after having passed through the phase plate and the liquid crystal layer, is converted into the circularly-polarized light. Namely, the transmission light rotates on the Poincaré sphere by a quarter rotation, thereby moving to a pole P. After having been reflected, the transmission light passes through the liquid crystal layer and the phase plate again, thereby becoming the linearly-polarized light the oscillation direction of which has rotated by 90°. Namely, the transmission light rotates on the Poincaré sphere by a one-fourth rotation again, thereby moving to a point L2 situated on the opposite side of the point L1 on the equator.

FIG. 2 illustrates the ideal polarization conversion on the bright display. The transmission light after having passed through the polarizer has become the linearly-polarized light, thus being positioned at the point L1 on the equator on the Poincaré sphere. Then, the transmission light, after having passed through the phase plate and the liquid crystal layer, is converted into the linearly-polarized light the oscillation direction of which has rotated by 90°. Namely, the transmission light rotates on the Poincaré sphere by a half rotation, thereby moving to the point L2 situated on the opposite side of the point L1 on the equator. After having been reflected, the transmission light passes through the liquid crystal layer and the phase plate again, thereby becoming the original linearly-polarized light. Namely, the transmission light rotates on the Poincaré sphere by a half rotation again, thereby returning back to L1.

Although the constant ratio is expressed by a ratio in the reflection between the time of the bright display and the time of the dark display, what exerts an influence upon the constant ratio mainly is the reflection at the time of the dark display. The optical parameters of the liquid crystal layer, the phase plates, and the polarizers are set so that, on the dark display, the polarization conversion as described above can hold in the entire visible wavelength band. Based on this setting, an upper-side polarizer, an upper-side phase plate, and the liquid crystal layer thickness of the reflection display unit are determined.

Next, the explanation will be given below concerning the ideal polarization conversion in the transmission display unit and a lower-side polarization plate and a lower-side phase plate implementing this polarization conversion. In the case where there exists no layer gap between the reflection display unit and the transmission display unit, if a backlight light is incident into the liquid crystal layer in a state of having become a circularly-polarized light, the ideal dark display can be obtained. Namely, at the time of the dark display, the liquid crystal layer and the upper-side phase plate add a phase difference of a quarter wavelength to a light passing therethrough. Consequently, if the circularly-polarized light is incident therein, it is converted into a linearly-polarized light, then being completely absorbed by the upper-side polarizer. In order to convert the backlight light into the circularly-polarized light, it is advisable to make the lower-side phase plate a quater wavelength plate, and to locate a transmission axis of the lower-side polarizer in such a manner as to form 45° toward a slow axis of the lower-side phase plate.

FIG. 3 illustrates the above-described situation, using the Poincaré sphere notation. FIG. 3 illustrates a Poincaré sphere display of the transmission display unit in the case where there exists no layer gap between the reflection display unit and the transmission display unit. Accordingly, FIG. 3 illustrates the ideal polarization conversion on the dark display. The transmission light after having passed through the polarizer has become the linearly-polarized light, thus being positioned at a point L1 on the equator on the Poincaré sphere. Then, the transmission light, after having passed through the polarizer and the lower-side phase plate, is converted into the circularly-polarized light, thereby moving to a pole P. Moreover, after having passed through the first liquid crystal layer, the transmission light passes through the upper-side phase plate, thereby becoming the linearly-polarized light the oscillation direction of which has rotated by 90° and moving to a point L2.

On the Poincaré sphere notation, the conversion of the polarization state by the phase plates is expressed as a rotation around a rotation axis existing within the (S1, S2) plane and penetrating the center of the Poincaré sphere. This rotation axis is equivalent to the slow axis of the phase plates. In FIG. 3, the rotation axis SA indicating the slow axis of the phase plates is expressed by the dashed line. Assuming that an angle formed between the transmission axis of the lower-side polarizer and the slow axis of the lower-side phase plate is equal to θ, an angle formed between L1 and the rotation axis is equal to 2θ. In FIG. 3, since the angle formed between the transmission axis of the lower-side polarizer and the slow axis of the lower-side phase plate is equal to 45°, the angle formed between L1 and the rotation axis is equal to 90°.

Meanwhile, in the case where there exists a layer gap between the reflection display unit and the transmission display unit, and the transmission display unit is thicker in the liquid crystal layer thickness, let's consider dividing the liquid crystal layer of the transmission display unit into two portions with reference to the thickness direction. Considering, as a boundary, a lower-side interfacial plane of the liquid crystal layer of the reflection display unit, the side lower than this is assumed to be a layer-gap unit liquid crystal layer, and the side upper than this is assumed to be a reflection display unit liquid crystal layer.

At a point-in-time when the backlight light has passed through the layer-gap unit liquid crystal layer and has reached the boundary, if the backlight light has become a circularly-polarized light, the requirements will be satisfied. Namely, in order that the layer-gap unit liquid crystal layer will also add the phase difference to the backlight light, the combination of the lower-side phase plate and the layer-gap unit liquid crystal layer is required to operate similarly to a quarter wavelength plate. At this time, at a point-in-time of having passed through the lower-side phase plate, the backlight light becomes an elliptically-polarized light.

FIG. 4 illustrates the above-described situation, using the Poincaré sphere display. FIG. 4 illustrates a Poincaré sphere notation of the transmission display unit in the case where the transmission display unit is thicker in the liquid crystal layer thickness. Accordingly, FIG. 4 illustrates the ideal polarization conversion on that dark display. The transmission light after having passed through the lower-side polarizer has become a linearly-polarized light, thus being positioned at a point L1 on the equator on the Poincaré sphere. Then, the transmission light, after having passed through the polarizer and the lower-side phase plate, is converted into the elliptically-polarized light E. Moreover, after having passed through the layer-gap unit liquid crystal layer, the transmission light is converted into the circularly-polarized light, thereby moving to a pole P. In addition, the transmission light passes through the reflection display unit liquid crystal layer and the upper-side phase plate, thereby becoming a linearly-polarized light the oscillation direction of which has rotated by 90° and moving to a point L2 on the equator.

The movement from the elliptically-polarized light E to the pole P is an operation caused by the layer-gap unit liquid crystal layer, and a rotation angle from the elliptically-polarized light E to the pole P is denoted by ψ. In order to convert the backlight light into the elliptically-polarized light E after the backlight light has passed through the lower-side phase plate, an angle formed between the rotation axis and L1 must be made equal to 90° or less on the Poincaré sphere. An angle by the amount of the shifting from 90° of the angle formed between the rotation axis and L1 is equal to 90°−2θ. As is clearly seen from FIG. 4, ψ is equal to 90°−2θ. Also, letting a substantial birefringence of the liquid crystal layer be Δn, the layer-gap between the reflection display unit and the transmission display unit be d, and a wavelength of the backlight light be λ, ψ is represented by the following equation:

$$\psi = 360° \times \Delta n d / \lambda \quad (1)$$

Also, from the condition that ψ is equal to 90°−2θ, the following equation can be obtained:

$$45° - = 180° \times \Delta n d / \lambda \quad (2)$$

In this way, the mutual connection has been established between d, i.e., the layer-gap between the reflection display unit and the transmission display unit, and θ, i.e., the angle formed between the lower-side polarizer absorption axis and the lower-side phase plate slow axis.

Namely, from the equation (2), even if the layer-gap d between the reflection display unit and the transmission display unit is varied, θ is adjusted in accordance with the equation (2). This makes it possible to reduce the dark display transmission on the transmission display. Also, in the case where the layer-gap d between the reflection display unit and the transmission display unit is varied, the lower-side phase plate need not be replaced by the other type of phase plate with a different retardation. Rather, it is advisable enough to change the pasting angle of the lower-side phase plate in accordance with the equation (2).

Also, in correspondence with the layer-gap d between the reflection display unit and the transmission display unit, θ is set in accordance with the equation (2). This makes it possible to convert, into the circularly-polarized light, the backlight light at the point-in-time of having passed through layer-gap liquid crystal layer. At this time, if the upper-side polarizer and the upper-side phase plate have been set in advance so that a light having passed through the upper-side polarizer, the upper-side phase plate, and the first liquid crystal layer becomes a circularly-polarized light, it becomes possible to sufficiently reduce the dark display transmittance on the transmission display, thereby allowing a high contrast ratio transmission display to be obtained. Also, if the light having passed through the upper-side polarizer, the upper-side phase plate, and the first liquid crystal layer has become the circularly-polarized light, it becomes possible to sufficiently reduce the dark display reflection on the reflection display. In this way, the high contrast ratio transmission display and the high contrast ratio reflection display can be obtained simultaneously. What is more, the reflection in the reflection display unit and the transmissivity in the transmission display unit can be reduced sufficiently in one and the same applied voltage.

By the way, the above-described lower-side phase plate can be configured with two sheets of phase plates. The two sheets of phase plates are referred to as a first lower-side phase plate and a second lower-side phase plate from the one nearer to the liquid crystal layer. It has been known the following: In general, the combination of a quarter wavelength plate and a half wavelength plate makes it possible to form a circular polarization plate with a broad-band, thereby allowing the transmission lights in the entire visible wavelength range to be converted into polarized lights closer to circularly-polarized lights. As is the case with this, the retardation of the first lower-side phase plate and that of the second lower-side phase plate are set to be a quarter wavelength and a half wavelength, respectively. An elliptical polarizer formed as the result of this allows the transmission lights in the entire visible wavelength range to be converted into elliptically-polarized lights that are more identical to each other, thereby making it possible to obtain the transmission lights with an even higher contrast ratio.

DETAILED DESCRIPTION OF THE EMBODIMENTS

Next, the explanation will be given below concerning the embodiments in the present invention.

1st Embodiment

Figure 1:
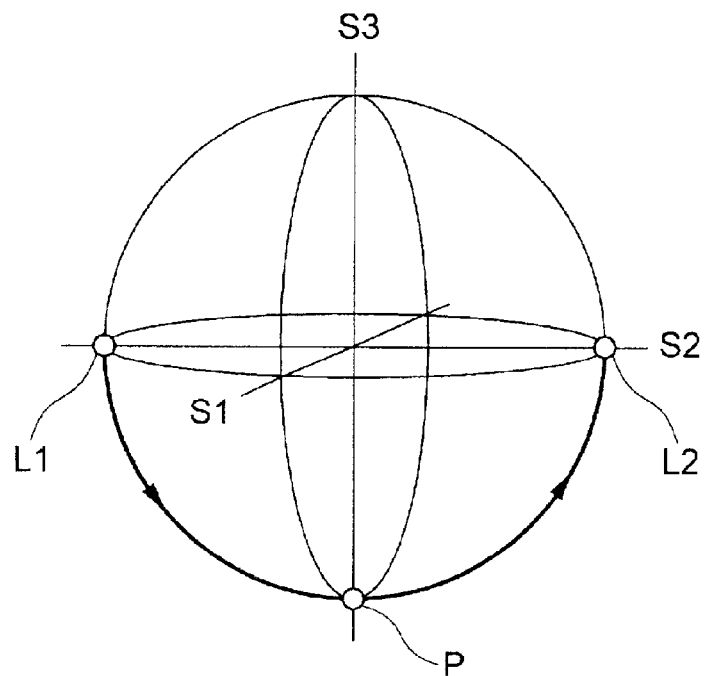
FIG. 1 is a diagram for illustrating the ideal polarization conversion on the dark display.
Figure 2:
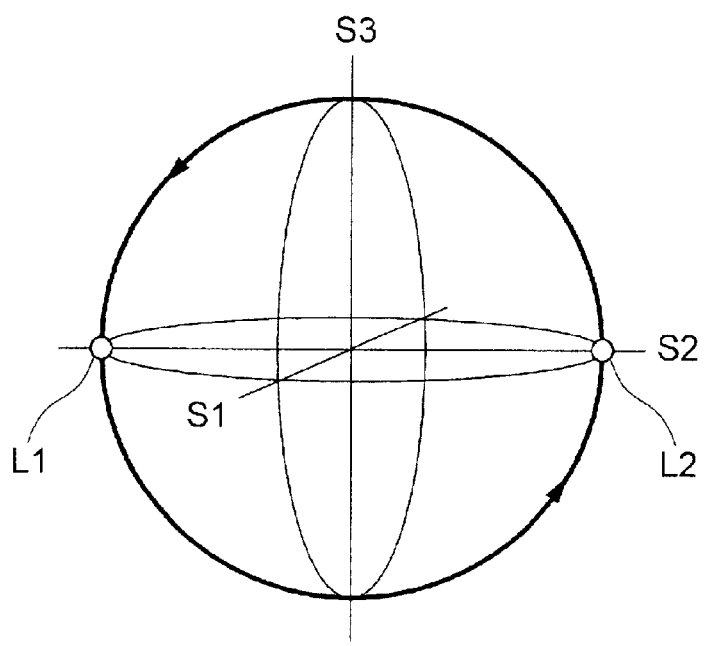
FIG. 2 is a diagram for illustrating the ideal polarization conversion on the bright display.
Figure 3:
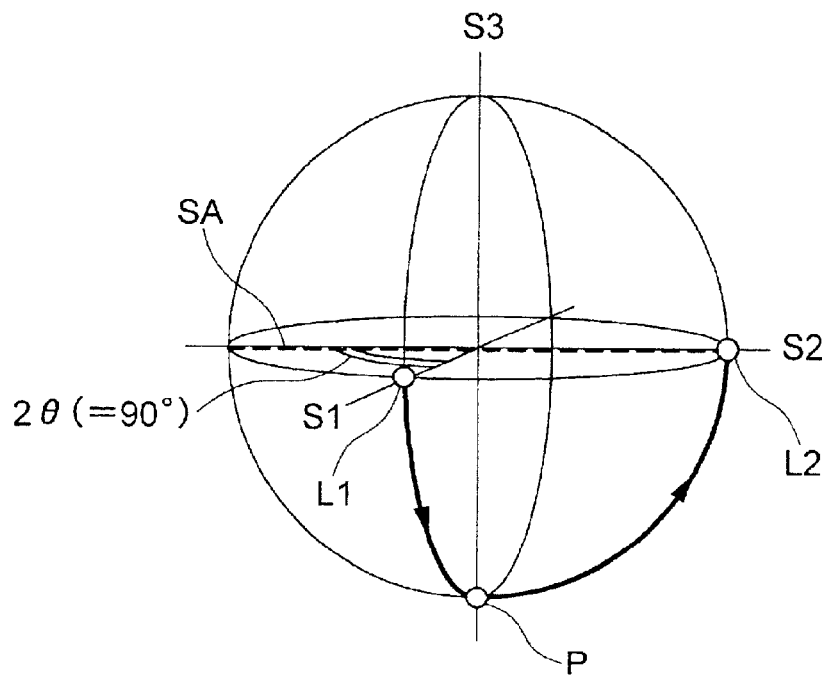
FIG. 3 is a diagram for illustrating a Poincaré sphere notation of the transmission display unit in the case where there exists no layer-gap between the reflection display unit and the transmission display unit.
Figure 4:
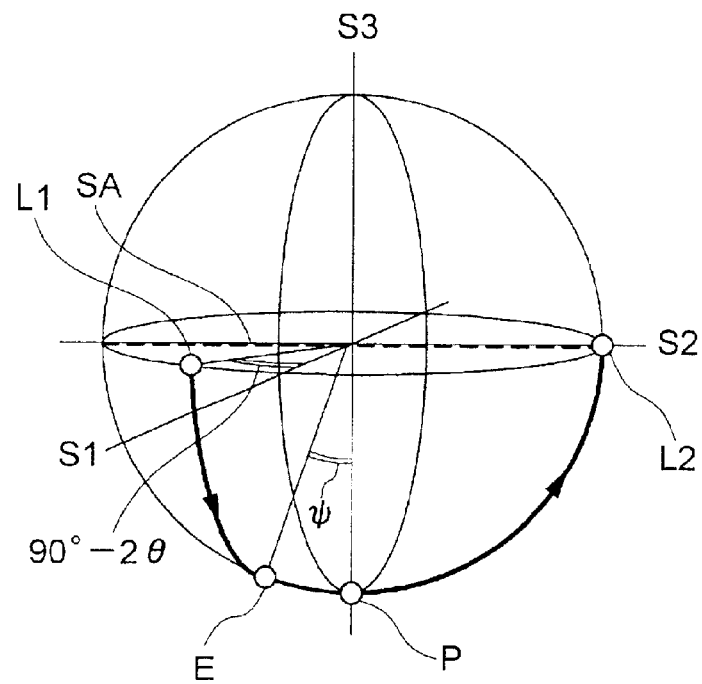
FIG. 4 is a diagram for illustrating a Poincaré sphere notation of the transmission display unit in the case where the transmission display unit is thicker in the liquid crystal layer thickness.
Figure 5:
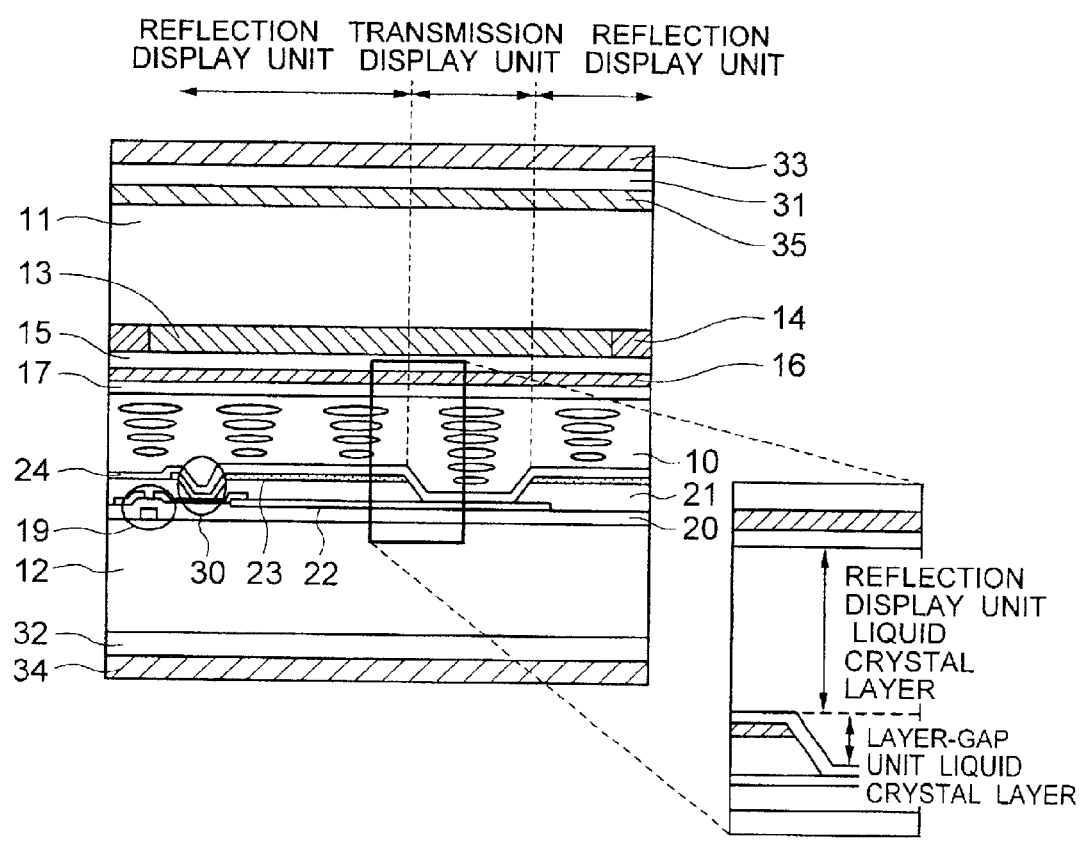
FIG. 5 is a diagram for illustrating a liquid crystal display apparatus according to a 1st embodiment.

FIG. 5 illustrates a liquid crystal display apparatus according to the present embodiment. The liquid crystal display apparatus includes a first substrate 11, a liquid crystal layer 10, and a second substrate 12, and the liquid crystal layer is held in being sandwiched between the first substrate and the second substrate. The first substrate has, on the side in closer proximity to the liquid crystal layer, a color filter 13, a black matrix 14, a leveling layer 15, a common electrode 16, and a first orientation film 17. Also, the second substrate has, on the side in closer proximity to the liquid crystal layer, a thin film transistor 19 and a second orientation layer 24. The thin film transistor 19, which is anti-staga type, is connected to a scanning lines, a signal line, a reflection electrode 23, and a transparent electrode 22. The scanning lines and the signal lines are insulated by a first insulating layer 20, and the signal lines and the reflection electrode are insulated by a second insulating layer 21. The reflection electrode 23 and the transparent electrode 22 are insulated by the second insulating layer. The transparent electrode 22 and the thin film transistor 19 exist in one and the same layer, and are connected to each other directly. The reflection electrode 23 and the thin film transistor 19 exist in different layers, and are connected to each other via a through hole 30. A second orientation film 24 exists on the reflection electrode 23, and is positioned in proximity to the liquid crystal layer so as to determine its orientation direction.

The first substrate 11 is formed of borosilicate glass, and is 0.7 mm thick. The color filter, which has its own respective portions presenting red, green, and blue colors and arranged repeatedly in a stripe-like manner, has the resin-based black matrix in a portion corresponding to a spacing between the pixels. The resin-based leveling layer 15 has planarized depressions and projections caused by the color filter and the black matrix. The common electrode 16 is formed of ITO (i.e., Indium Tin Oxide), and its layer thickness is 0.14 μm. A Sun Ever manufactured by Nissan Kagaku Corporation is employed as the first orientation layer 17, the layer thickness of which has been set to be 0.2 μm.

As is the case with the first substrate, the second substrate 12 is formed of borosilicate glass, and is 0.7 mm thick. As is the case with the first orientation layer, the second orientation layer 24 is formed of the Sun Ever manufactured by Nissan Kagaku Corporation, and its layer thickness is 0.2 μm. The signal lines and the scanning lines are formed of chromium, and the first insulation layer 20 is a silicon nitride film. The second insulation layer 21 is a silicon nitride film, the layer thickness of which has been set to be 0.6 μm. The transparent electrode is formed of ITO, and its layer thickness is 0.14 μm.

As illustrated in FIG. 5, the reflection electrode 23 exists over the transparent electrode 22. A portion where the diffusion reflection electrode within one pixel exists is a reflection display unit. A portion where the reflection electrode 23 does not exist and the transparent electrode 22 appears is a transmission display unit. The reflection display unit and the transmission display unit have been illustrated in FIG. 5.

A fluorine-based liquid crystal material the birefringence of which is equal to 0.073 has been employed as the liquid crystal layer. Perfect sphere-shaped polymer beads that are 4.0 µm in diameter are dispersed with a proportion of about 100 per 1 mm². This has made the liquid crystal layer thickness equal to 3.9 µm, and has made the liquid crystal layer thickness substantially uniform over the entire display unit. The first orientation film 17 and the second orientation film 24 are subjected to an orientation processing by a rubbing method. The number of revolutions of the rubbing roll is set to be 3000 revolutions/minute, and the width of a contact portion with a rubbing roll is set to be 11 mm, and the pretilt angle of the liquid crystal layer is set to be about 5°. Also, the azimuth of the orientation processing is set suitably, and the first substrate and the second substrate are assembled so that, when the liquid crystal material is injected, the twist angle of the liquid crystal layer becomes equal to 50°.

An upper-side polarizer 33, an upper-side phase plate 31, and a diffusion adhesive agent 35 are located over the first substrate 11. An NRZ film manufactured by Nittou Denkou Corporation is employed as the upper-side phase plate 31, and an SEG1425DUHCAR manufactured by Nittou Denkou Corporation is employed as the upper-side polarizer 33. Setting the orientation processing direction of the second orientation layer 24 to be an azimuthal angle 0° and defining the azimuthal angle in a counterclockwise direction seen from the first substrate side, the pasting has been performed under a condition that the retarded-phase axis azimuthal of the upper-side phase plate 31 is equal to 56° and the absorption axis azimuthal angle of the upper-side polarizer 33 is equal to 69°. Also, the retardation of the upper-side phase plate 31 at a wavelength of 633 nm has been set to be 395 nm.

Figure 11:
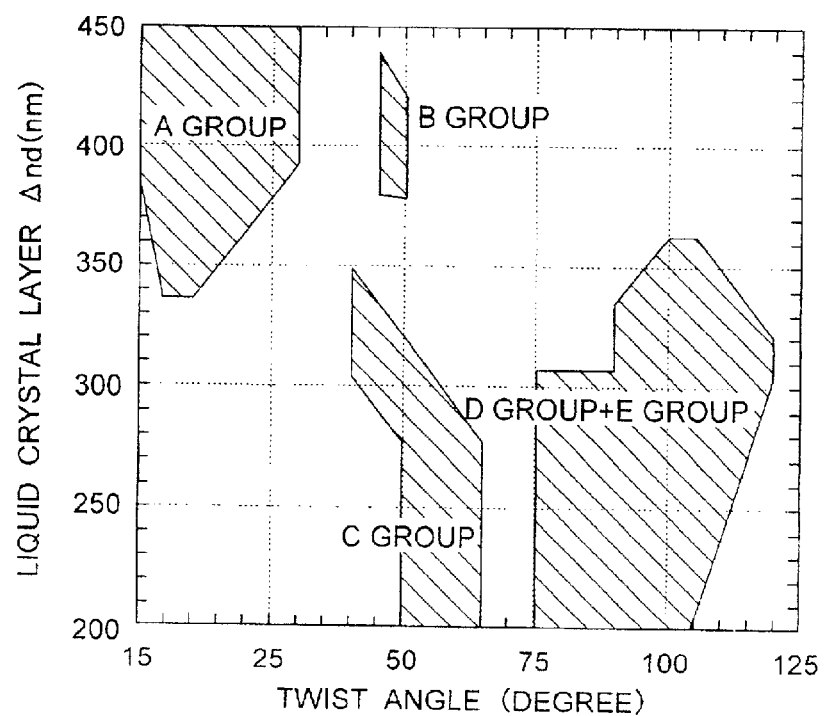
FIG. 11 is a diagram for illustrating the relationship between the twist angle of a liquid crystal layer and the retardation of the liquid crystal layer, which provides a high contrast ratio normally-closed display.
Figure 12:
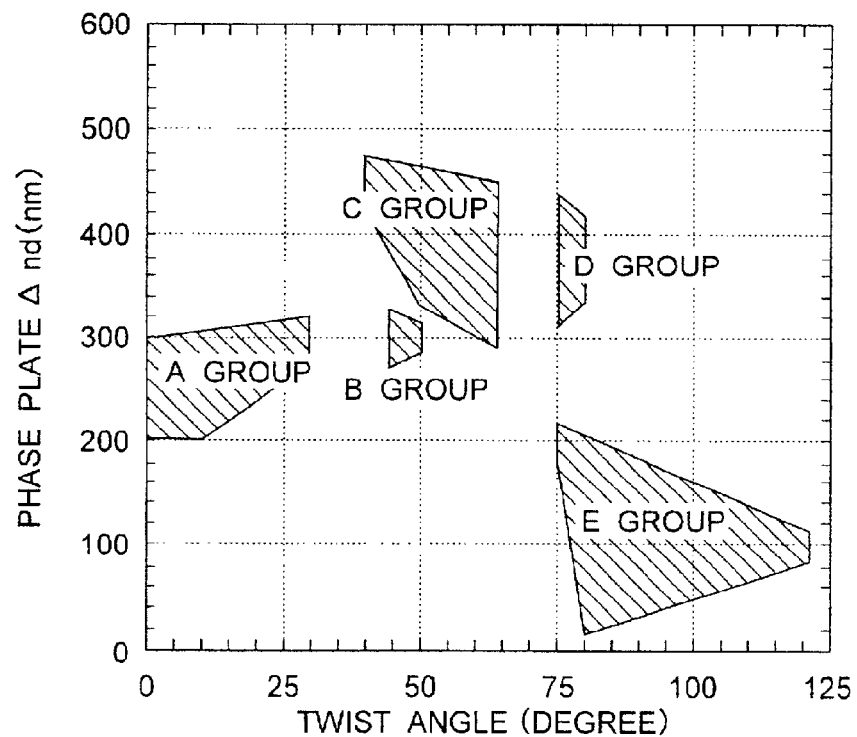
FIG. 12 is a diagram for illustrating the relationship between the twist angle of a liquid crystal layer and the retardation of the liquid crystal layer, which provides a high contrast ratio normally-closed display.
Figure 13:
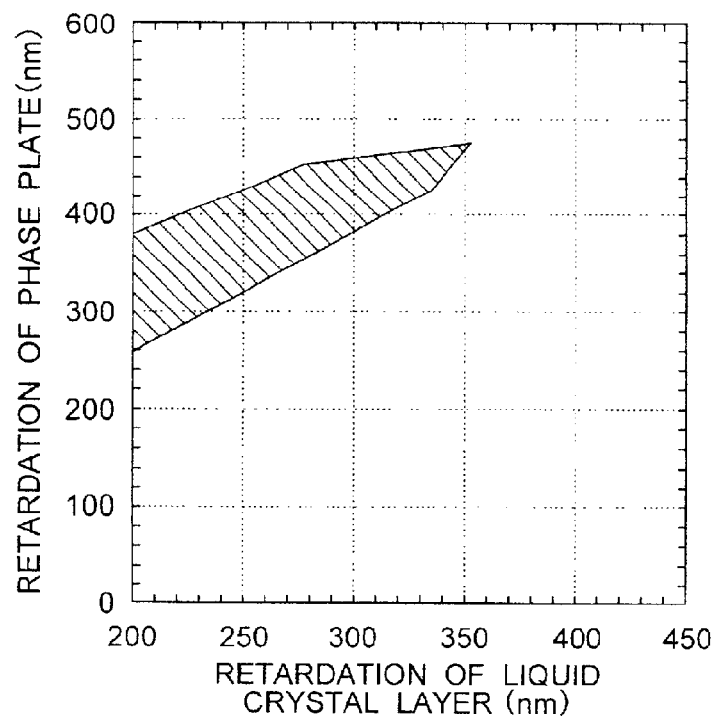
FIG. 13 is a diagram for illustrating the relationship between the retardation of a liquid crystal layer and the retardation of an upper-side phase plate.
Figure 14:
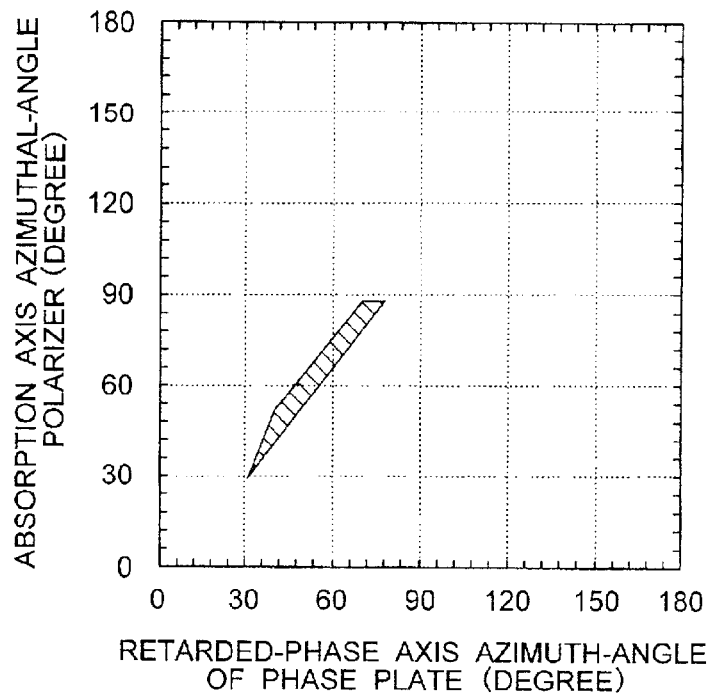
FIG. 14 is a diagram for illustrating the relationship between the absorption axis azimuthal angle of an upper-side polarizer and the slow axis azimuthal angle of an upper-side phase plate.

The above-described absorption axis azimuthal angle of the upper-side polarization plate 33 and the slow axis azimuthal angle and the retardation of the upper-side phase plate 31 have been determined in the following way: Namely, the optical characteristics in the normal direction of the liquid crystal layer having a regularly-twisted structure have been described in a literature given by S. Chandrasekar, G. S. Ranganath, U. D. Kini, K. A. Suresh et al., i.e., Mol. Crist. Liq. Cryst, Vol. 24 (1973), pp. 201–211. Assuming that the polarization state of the transmission light at a point-in-time of immediately before incident into the liquid crystal layer had been a circularly-polarized light, the polarization state of the transmission light after having passed through the liquid crystal layer has been calculated. Then, the twist angle and the retardation of the liquid crystal layer, and the retardation and the slow axis azimuthal angle of the phase plate have been determined so that the calculated polarization state will be converted into linearly-polarized lights in a wide visible wavelength range. As a consequence, solution distributions as illustrated in FIG. 11 and FIG. 12 have been obtained. The sloped-line portions in the drawings indicate the solution distributions providing high contrasts, and the solutions form several groups. As illustrated in FIG. 11 and FIG. 12, the solutions are classified into A group, B group, C group, D group, and E group and, of these groups, it has been decided that C group will be selected. In the solution of C group, FIG. 13 illustrates the relationship between the retardation of the liquid crystal layer and the retardation of the phase plate, and FIG. 14 illustrates the relationship between the absorption axis azimuthal angle of the polarizer and the slow axis azimuthal angle of the phase plate. In accordance with these drawings, the retardation of the liquid crystal layer is selected from within the range of 200 nm to 350 nm, the retardation of the phase plate is selected from within the range of 250 nm to 470 nm, the slow axis azimuthal angle of the phase plate is selected from within the range of 30° to 75° and the absorption axis azimuthal angle of the polarizer is selected from within the range of 30° to 90°. Moreover, a combination satisfying the solution is selected, then performing the setting. Furthermore, after determining the oscillation directions of the polarized lights after having passed through the phase plate (which are the linearly-polarized lights or elliptically-polarized lights close thereto), the absorption axis azimuthal angle of the polarizer has been defined so that the determined oscillation directions will become parallel to the absorption axis. In this way, it becomes possible to determine, as was described earlier, the absorption axis azimuthal angle of the upper-side polarizer and the slow axis azimuthal angle and the retardation of the upper-side phase plate.

Next, an Nz coefficient of the upper-side phase plate 31 is set to be 0.0. The Nz coefficient, which is a coefficient for indicating the three-dimensional distribution of a refractive index, has been defined by the following equation in a presentation given by Yasuo Fujimura, Tatsuki Nagatsuka, Hiroyuki Yoshimi, Takefumi Simomura et al. (SID '91 DIGEST (1991), pp. 739–742):

$$Nz=(nx-nz)/(nx-ny) \quad (3)$$

Here, nx and ny are the refractive indexes within a plane, and nx is the refractive index in the slow axis direction, and ny is the refractive index in an fast axis direction. Further, nz is the refractive index in the thickness direction.

Figure 15:
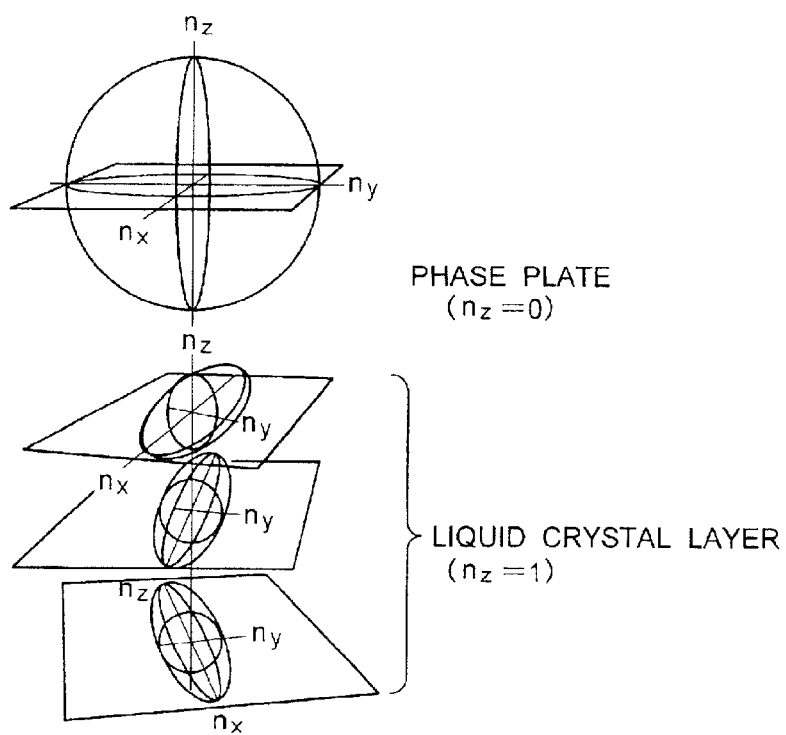
FIG. 15 is a diagram for illustrating the combination of a refractive index ellipsoid of a phase plate and that of a liquid crystal layer, which satisfactorily compensates the phase difference in a viewing angle direction.
Figure 16:
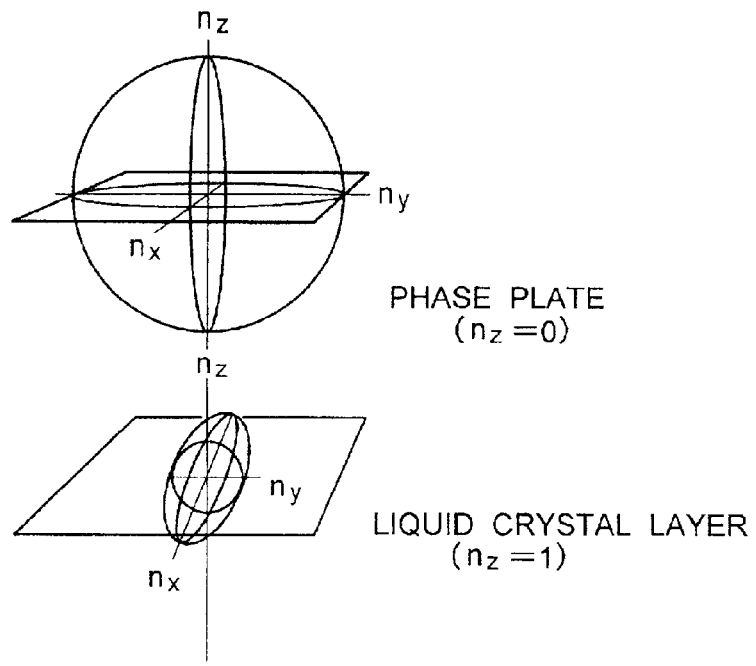
FIG. 16 is a diagram for illustrating the combination of the refractive index ellipsoid of the phase plate and that of the liquid crystal layer, which provides a high contrast ratio when the liquid crystal layer in FIG. 15 is approximated to a uniaxial medium.
Figure 17:
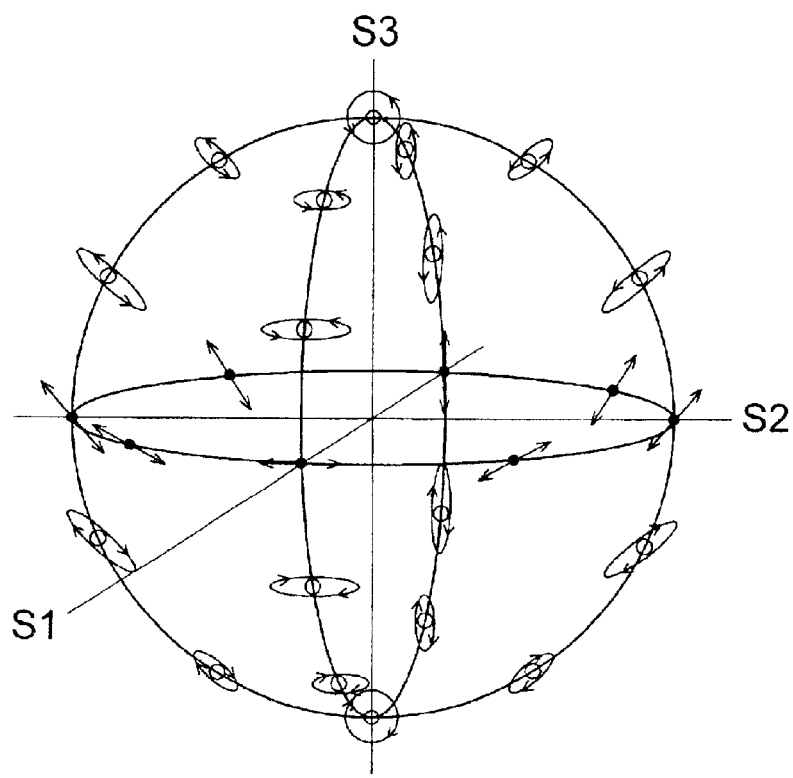
FIG. 17 is a diagram for illustrating the polarization states corresponding to the respective points on the Poincaré sphere.

The twist angle of the liquid crystal layer in the present embodiment is equal to 50°, which is a small value. Consequently, its optical characteristics are close to those of a uniaxial medium the Nz coefficient of which is 1.0. On account of this, the combination of the liquid crystal layer with the phase plate the Nz coefficient of which is 0.0 makes it possible to reduce a viewing angle variation in the phase difference. FIG. 15 illustrates the location of refractive index ellipsoids of both the liquid crystal layer and the phase plate in this state. The phase plate the Nz coefficient of which is 0.0 has a disk-shaped refractive index ellipsoid, and the liquid crystal layer has a rugby-ball-shaped refractive index ellipsoid. Since the shapes of the refractive index ellipsoids are different from each other, the phase difference can be satisfactorily compensated even in viewing directions in which the refractive index in the thickness direction makes a contribution thereto. Furthermore, the ellipsoids are located so that, when seen from the normal direction, the slow axis of the phase plate and the orientation direction of the liquid crystal layer become perpendicular to each other. This condition causes the slow axis of the phase plate and that of the liquid crystal layer to become perpendicular to each other in all the viewing angles, thereby allowing the phase difference between the both to be compensated more satisfactorily in all viewing angles. FIG. 16 approximately illustrates the location of the refractive index ellipsoids of the both in this state. In the present embodiment, the slow axis of the phase plate has been set to be 55° with reference to the orientation direction of the lower-side board. This is equivalent to the fact that the slow axis forms 105° with reference to the orientation direction of the upper-side substrate and forms 80° with reference to an average direction of the liquid crystal layer's orientation (i.e., an orientation direction in the center of the liquid crystal layer), which will be found to be close to the condition illustrated in FIG. 16. Causing the Nz coefficient to approach the ideal value, i.e., 0.0, in the phase plate's location like this permits the viewing angle characteristics to be compensated satisfactorily, thereby making it possible to obtain an even higher contrast ratio.

In this way, it becomes possible to obtain the normally-closed type reflection display unit where the dark display can be obtained at the time of no voltage application and the reflection is increased with the voltage application.

The diffusion adhesive agent results from dispersing infinitesimal spheres within an adhesive agent, and exhibits a property of diffusing the transmission light by differences in the refractive index between the adhesive agent and the infinitesimal spheres. This property reduces a specular reflection of the reflection electrode so as to remove the reflected images of surrounding objects from display unit, and allows lights incident from the surroundings to be reflected in the normal direction with a higher proportion, thereby making it possible to increase the brightness.

Figure 6:
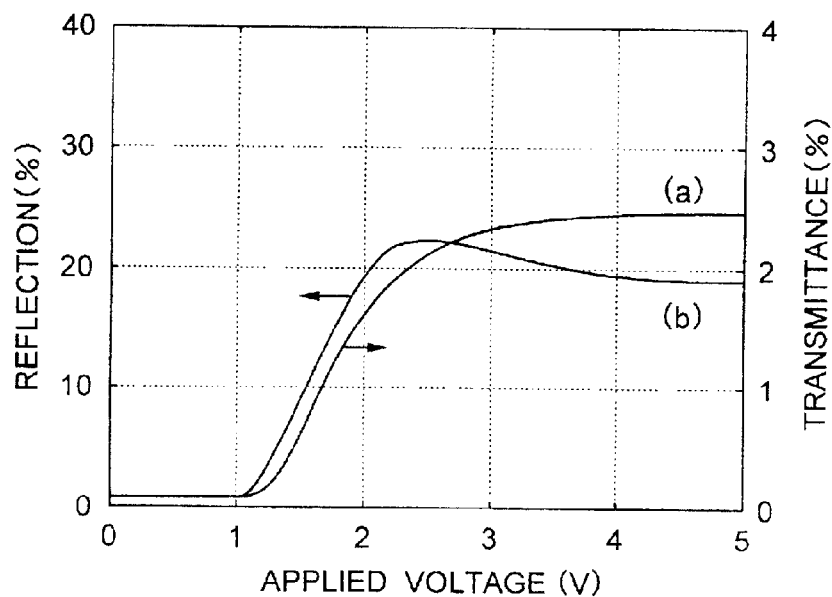
FIG. 6 is a diagram for illustrating the display characteristics of a reflection display unit and a transmission display unit of the liquid crystal display apparatus according to the 1st embodiment.

Next, the display characteristic of the reflection display by the liquid crystal display apparatus created in this way has been estimated. Using an integration sphere light-source, the light irradiation is equally performed toward a sample from within an viewing angle range of 45° with the normal direction employed as the center, and the luminance in this state has been measured from the normal direction. FIG. 6 illustrates the measurement result as a display characteristic (a). As illustrated in the drawing, the normally-closed type display characteristic has been obtained where the reflection becomes its minimum at the time of no voltage application and afterwards, the reflection is increased with the voltage application. Also, the maximum value of the reflection is obtained in the applied voltage of 2.5 V, and the reflection at that time is 22.6%. Also, the contrast ratio has been 28:1.

Subsequently, after changing the irradiation condition of the light-source, the display characteristic of the reflection display has been estimated again. The light irradiation is performed toward the sample from a direction inclined by 30° from the normal direction. Defining, as 100%, the luminance of a standard diffusion plate measured under the above-described condition, the maximum value of the reflection has been 23.1%. Also, the contrast ratio has been 32:1.

Next, the explanation will be given below concerning the details of the transmission display unit. A lower-side polarizer 34 and a lower-side phase plate 32 are located under the second substrate 12. The NRZ film manufactured by Nittou Denkou Corporation is employed as the lower-side phase plate 32, and the SEG1425DUN manufactured by Nittou Denkou Corporation is employed as the lower-side polarizer 34. Incidentally, as the lower-side phase plate, other than the NRZ film, it is possible to employ an ARTON the wavelength dependence of the birefringence of which is smaller or a film the birefringence of which is decreased with the wavelength. In this case, since the wavelength dependence of the transmission light's polarization state is reduced, it is possible to obtain the transmission display with an even higher contrast ratio.

The second insulating layer 21 is 0.6 $\mu$m thick and the reflection electrode 23 is 0.2 $\mu$m thick, and consequently the layer-gap between the reflection display unit and the transmission display unit is equal to 0.8 $\mu$m. Also, the birefringence of the liquid crystal material at the wavelength of 633 nm is equal to 0.072. By substituting these values into the equation (2), an angle formed between the transmission axis of the lower-side polarizer 34 and the slow axis of the lower-side phase plate 32 has been determined to be 28.6°.

Based on this calculation result, the angle formed between the transmission axis of the lower-side polarizer 34 and the slow axis of the lower-side phase plate 32 is fixed to 29°, and then the axis location has been determined where the transmission at the time of no voltage application becomes its minimum. As a consequence, the slow axis azimuthal angle of the lower-side phase plate has been set to be 34°, and the absorption axis azimuthal angle of the lower-side polarizer has been set to be 65°. Also, the retardation of the lower-side phase plate at the wavelength of 633 nm has been set to be 134 nm, and the Nz coefficient has been set to be 1.0. In this way, as is the case with the reflection display unit, the transmission display unit has been also formed into the normally-closed type.

Next, after placing a backlight at the rear of the lower-side polarizer 34, the display characteristic of the transmission display has been estimated from the normal direction. FIG. 6 simultaneously illustrates the measurement result as a display characteristic (b). The normally-closed type display characteristic has been obtained where the transmission becomes its minimum at the time of no voltage application and afterwards, the reflection is increased with the voltage application. Also, the transmission has been 2.1% in the applied voltage of 2.5 V where the maximum value of the reflection is obtained. Also, the contrast ratio has been 35:1.

In the usage environment such as outdoors in the evening and indoors with a comparatively weak illumination, a light that is substantially as bright as the backlight light is incident therein from the surroundings. This, in some cases, makes the transmission display look almost as bright as the reflection display. However, the formation of both the transmission display and the reflection display into the same normally-closed type permits the high contrast ratio to be obtained even when the transmission display and the reflection display co-exist with almost the same brightness.

As having been explained above, the angle formed between the transmission axis of the lower-side polarizer and the slow axis of the lower-side phase plate is determined by the equation (2), taking into consideration the layer-gap between the reflection display unit and the transmission display unit. Next, the transmission axis of the lower-side polarizer and the slow axis of the lower-side phase plate are set in accordance with the angle determined. This method has made it possible to obtain the reflection-type liquid crystal display apparatus where both the transmission display unit and the reflection display unit exhibit the high contrast ratio.

2nd Embodiment

In the liquid crystal display apparatus illustrated in the 1st Embodiment, the thickness of the second insulation layer 21 is increased up to 0.8 $\mu$m. This increases the distance between the transparent electrode and the reflection electrode to decrease the capacitance coupling between the both, thereby making it possible to enhance the uniformity in the display.

Moreover, the lower-side polarizer 34 and the lower-side phase plate 32 are located under the second substrate 12. The second insulating layer 21 is 0.8 $\mu$m thick and the diffusion reflection electrode 23 is 0.2 $\mu$m thick, and consequently the layer-gap between the reflection display unit and the transmission display unit is equal to 1.0 $\mu$m. Also, the birefringence of the liquid crystal material at the wavelength of 633 nm is equal to 0.072. By substituting these values into the equation (2), the angle formed between the transmission axis of the lower-side polarizer 34 and the retarded-phase axis of the lower-side phase plate 32 has been determined to be 24.2°.

Based on this calculation result, the angle formed between the transmission axis of the lower-side polarizer 34 and the slow axis of the lower-side phase plate 32 is fixed to 24°, and then the axis location has been determined where the transmission at the time of no voltage application becomes its minimum. As a consequence, the slow axis azimuthal angle of the lower-side phase plate 32 has been set to be 34°, and the absorption axis azimuthal angle of the lower-side polarizer 34 has been set to be 58°. In this way, as is the case with the reflection display unit, the transmission display unit has been also formed into the normally-closed type.

Next, when estimating the display characteristic of the transmission display from the normal direction, the normally-closed type display characteristic has been obtained. Also, the transmission has been 2.1% in the applied voltage of 2.7 V where the maximum value of the reflection is obtained. Also, the contrast ratio has been 42:1.

As having been explained above, the angle formed between the transmission axis of the lower-side polarizer and the slow axis of the lower-side phase plate is determined by the equation (2), taking into consideration the layer-gap between the reflection display unit and the transmission display unit. Next, the transmission axis of the lower-side polarizer and the slow axis of the lower-side phase plate are set in accordance with the angle determined. This method has made it possible to obtain the reflection-type liquid crystal display apparatus where both the transmission display unit and the reflection display unit exhibit the high contrast ratio.

3rd Embodiment

Figure 7:
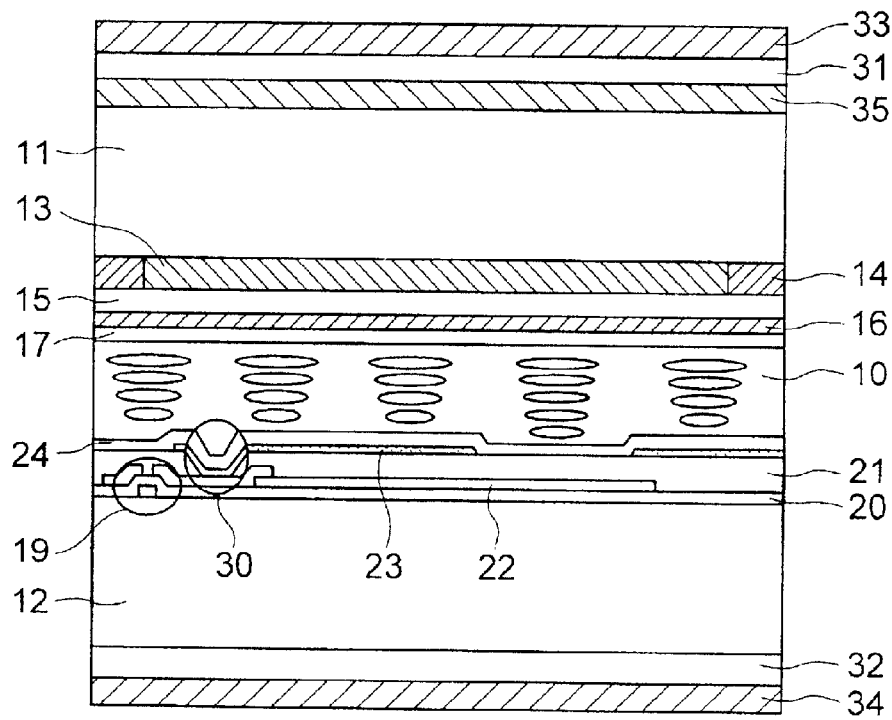
FIG. 7 is a diagram for illustrating a liquid crystal display apparatus according to a 3rd embodiment.

In the liquid crystal display apparatus illustrated in the 1st Embodiment, the second insulation layer 21 has been left without being removed in the transmission display unit. FIG. 7 is a cross-sectional view for illustrating a liquid crystal display apparatus in the present embodiment. As illustrated in FIG. 7, a configuration has been employed where the upper surface of the transparent electrode 22 is covered with the second insulation layer. In the case where, just like the 1st Embodiment, the second insulation layer 21 is removed in the transmission display unit, the layer-gap equivalent to the thickness of the second insulation layer 21 appears between the reflection display unit and the transmission display unit. This results in a possibility that a display defect such as domain occurs. In order to prevent the display failure like this, the second insulating layer 21 must be etched with a taper of about 45° associated therewith, instead of etching the second insulation layer vertically. As a result, in a portion corresponding to the taper, the liquid crystal layer thickness becomes a value that is different from the value in the normal transmission display unit. This increases the dark display transmissivity, thus decreasing the contrast ratio on the transmission display. In the present embodiment, the second insulation layer 21 has been left in the transmission display unit, thereby making it possible to reduce the layer-gap between the reflection display unit and the transmission display unit down to the thickness of the reflection electrode 23. Also, the portion corresponding to the taper is decreased, which makes it possible to obtain an effect of further decreasing the dark display transmission to increase the contrast ratio on the transmission display.

Meanwhile, the lower-side polarizer 34 and the lower-side phase plate 32 are located under the second substrate 12. The layer-gap between the reflection display unit and the transmission display unit is equal to 0.2 μm, which is the thickness of the reflection electrode 23. Also, the birefringence of the liquid crystal material at the wavelength of 633 nm is equal to 0.072. By substituting these values into the equation (2), the angle formed between the transmission axis of the lower-side polarizer 34 and the slow axis of the lower-side phase plate 32 has been determined to be 40.8°.

Based on this calculation result, the angle formed between the transmission axis of the lower-side polarizer 34 and the slow axis of the lower-side phase plate 32 is fixed to 41°, and then the axis location has been determined where the transmission at the time of no voltage application becomes its minimum. As a consequence, the slow axis azimuthal angle of the lower-side phase plate has been set to be 54°, and the absorption axis azimuthal angle of the lower-side polarizer has been set to be 95°. In this way, as is the case with the reflection display unit, the transmission display unit has been also formed into the normally-closed type.

Next, when estimating the display characteristic of the transmission display from the normal direction, the normally-closed type display characteristic has been obtained. Also, the transmission has been 1.7% in the applied voltage of 2.7 V where the maximum value of the reflection is obtained. Also, the contrast ratio has been increased up to 55:1.

As having been explained above, the angle formed between the transmission axis of the lower-side polarizer and the slow axis of the lower-side phase plate is determined by the equation (2), taking into consideration the layer-gap between the reflection display unit and the transmission display unit. Next, the transmission axis of the lower-side polarizer and the slow axis of the lower-side phase plate are set in accordance with the angle determined. This method has made it possible to obtain a partial transflective liquid crystal display apparatus where both the transmission display unit and the reflection display unit exhibit the high contrast ratio.

Incidentally, in the present embodiment, the combination of the lower-side polarizer and the lower-side phase plate has been designed as the elliptical polarization plate. However, every polarized light the ellipticity of whose electric vector's trajectory (which, in general, becomes an ellipse) is not equal to 1 can also be interpreted as an elliptically-polarized light. If the elliptical polarization plate meant in the present invention is to be defined more concretely, the elliptically-polarized light whose phase has been shifted from a circularly-polarized light by the amount of a phase difference caused by the film thickness of the reflection electrode just like the present embodiment is defined as the lowest limit of the ellipticity. Then, a combination providing an elliptically-polarized light whose ellipticity is larger than this lowest limit is defined as the elliptical polarizer. The smallest value of the film thickness of the reflection electrode is of an order of 0.1 μm, and that is the smallest value of the layer-gap. The smallest value of the birefringence value of the liquid crystal material is of an order of 0.06. Thus, assuming that the transmission light's wavelength is equal to 550 μm, the phase difference given by these values becomes equal to $0.011\pi$. From this, a combination of the lower-side polarizer and the lower-side phase plate which provides an elliptically-polarized light whose phase has been shifted from the circularly-polarized light by $0.011\pi$ or more is defined as the elliptical polarizer.

4th Embodiment

Figure 8:
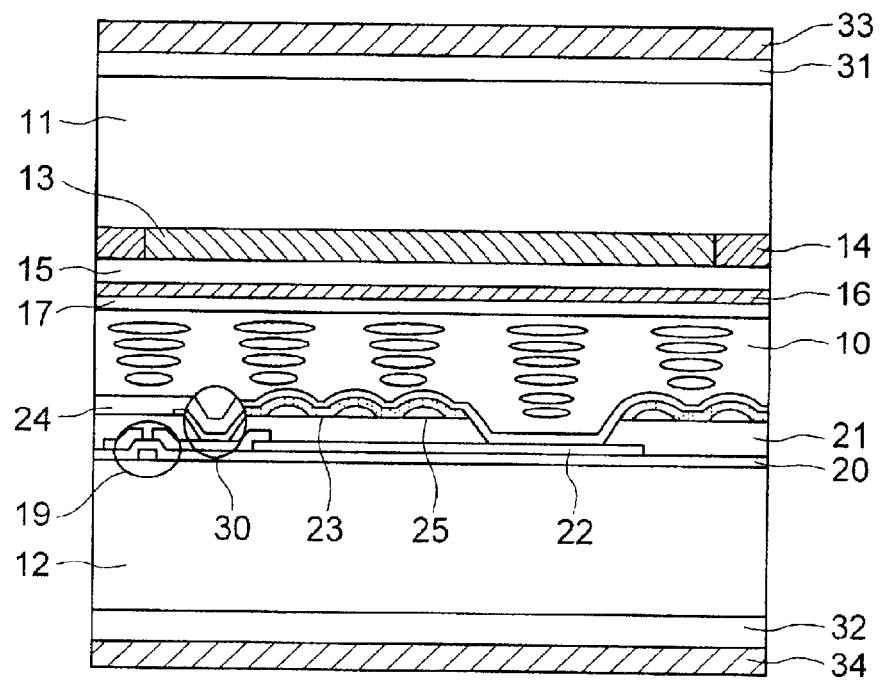
FIG. 8 is a diagram for illustrating a liquid crystal display apparatus according to a 4th embodiment.

In the reflection-type liquid crystal display apparatus illustrated in the 1st Embodiment, a depression-and-projection-formed layer 25 has been formed between the reflection electrode 23 and the second insulation layer 21. FIG. 8 is a cross-sectional view for illustrating a liquid crystal display apparatus in the present embodiment. Depressions and projections in the depression-and-projection-formed layer 25 form, on the reflection electrode, depressions and projections of a configuration similar thereto, thereby allowing the reflection electrode itself to exhibit a diffusion property. In association with this, the diffusion adhesive agent 35 illustrated in FIG. 5 is removed, and the phase plate 31 is fixed onto the substrate by an adhesive agent including no infinitesimal particles. The above-described diffusion adhesive agent has an advantage of being easily formed, but has a disadvantage of diffusing the light at a position away from the reflection electrode and thus decreasing the resolution. Also, the reflection electrode itself exhibits the diffusion property, which permits a reduction in the specular reflection to be implemented without decreasing the resolution.

The depression-and-projection-formed layer 25 is an organic film, and has been formed as follows: The organic film formed into a cylinder-shaped configuration by a photolithography is subjected to heat application and is made soft, then being formed into the projection-shaped configuration. In order to prevent a coloring caused by the interference effect by the lights reflected at the respective depressions and projections, the depression-and-projection-formed layer 25 has been located at random. The depression-and-projection-formed layer has been set to be 0.3 $\mu$m high. The configuration of the depression-and-projection-formed layer's bottom portion is a circular-shaped one, which has been set to be 5 $\mu$m in diameter.

Next, using an integration sphere light-source, the light irradiation is equally performed toward a sample from within an viewing angle range of 45° with the normal direction employed as the center, and the luminance in this state has been measured from the normal direction. The normally-closed type display characteristic has been obtained, and the maximum value of the reflectivity has been increased up to 25.6%. Also, the contrast ratio has been 32:1. The transmission display unit has also been the normally-closed type, and the transmissivity has been 2.1% in the applied voltage of 2.7 V. Also, the contrast ratio has been 37:1.

5th Embodiment

Figure 9:
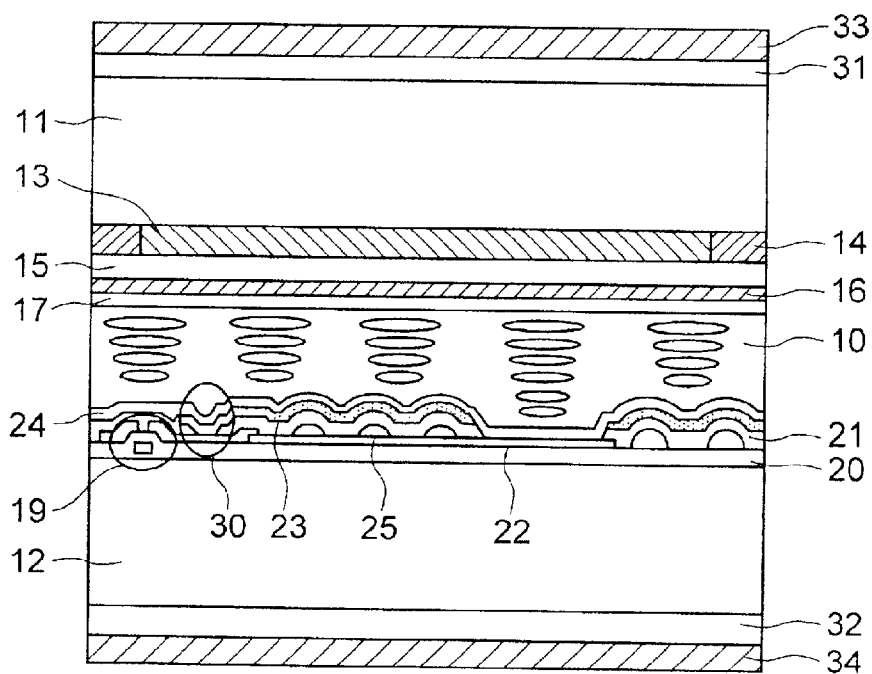
FIG. 9 is a diagram for illustrating a liquid crystal display apparatus according to a 5th embodiment.

In the reflection-type liquid crystal display apparatus illustrated in the 1st Embodiment, the depression-and-projection-formed layer 25 has been formed between the transparent electrode 22 and the second insulation layer 21. FIG. 9 is a cross-sectional view for illustrating a liquid crystal display apparatus in the present embodiment. Depressions and projections in the depression-and-projection-formed layer 25 have formed, on the reflection electrode, depressions and injections of a configuration similar thereto, thereby allowing the reflection electrode itself to exhibit a diffusion property. In association with this, the diffusion adhesive agent 35 illustrated in FIG. 5 is removed, and the phase plate 31 is fixed onto the substrate by the adhesive agent including no infinitesimal particles. In this case as well, as is the case with the 4th Embodiment, it becomes possible to implement the reduction in the specular reflection without decreasing the resolution.

6th Embodiment

Figure 10:
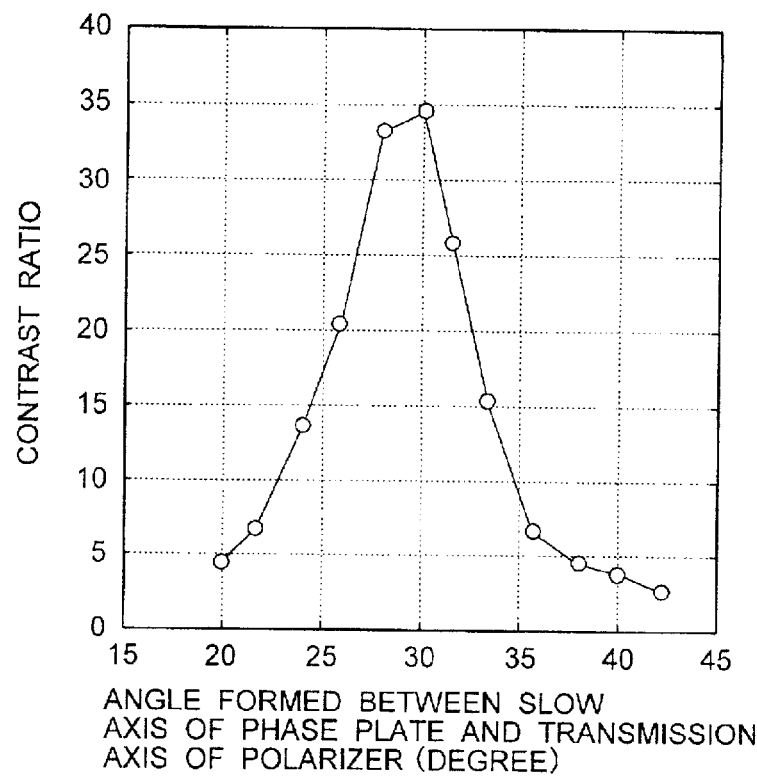
FIG. 10 is a diagram for illustrating the measurement result of a contrast ratio on the transmission display when an angle formed between the slow axis of a lower-side phase plate and the transmission axis of a lower-side polarizer is changed in the 1st embodiment.

In the liquid crystal display apparatus illustrated in the 1st Embodiment, the angle formed between the slow axis of the lower-side phase plate 32 and the transmission axis of the lower-side polarizer 34 have been changed two times each. Then, at the respective angles, the azimuthal angles thereof have been optimized, thereby measuring the contrast ratio on the transmission display. FIG. 10 illustrates the result thereof.

Light-emitting-type display apparatuses such as a CRT or transmission-type liquid crystal display apparatuses exhibit a contrast ratio exceeding 100:1 in a dark room. Under the existence of an illumination light or the sunlight, however, a reflection of about 1% or more takes place on the surface of the display unit. At bright indoors or at outdoors in a cloudy weather, the environmental light's intensity is equal to about 1000 cd/m$^2$, and in this case, a reflection light of about 10 cd/m$^2$ takes place. On account of this, even if the luminance at the time of the bright display is assumed to be 300 cd/m$^2$, the influence of the reflection light alone reduces the contrast ratio down to about 30:1 or less. Namely, the contrast ratio of the display apparatus by which a user makes an observation under the normal usage condition is equal to, at the highest, an order of 30:1. Accordingly, in the present invention, a first target of the contrast ratio has been set on 30:1, taking the above-described fact into consideration.

Also, of the transmission-type liquid crystal display apparatuses, a super-twisted nematic (STN)-type liquid crystal display apparatus that implements a large-capacity display using a matrix electrode is likely to be influenced by an orientation failure on the periphery of spacer beads or a non-uniformity of the liquid crystal layer thickness. This makes the contrast ratio become equal to 100:1 or less even in the dark room where there exists no interfacial reflection. Under the normal usage condition where there occurs the interfacial reflection, the contrast ratio of the STN-type liquid crystal display apparatus is equal to, at the highest, an order of 15:1. Accordingly, in the present invention, a second target of the contrast ratio has been set on 15:1.

Also, the layer gap between the reflection display unit and the transmission display unit is equal to 0.8 $\mu$m, and the birefringence of the liquid crystal material at the wavelength of 633 nm is equal to 0.072. From this, using the above-described equation (2), the angle formed between the transmission axis of the lower-side polarizer and the slow axis of the lower-side phase plate has been determined to be 28.6°. Based on this calculation result, in the 1st Embodiment, the angle formed between the transmission axis of the lower-side polarizer and the slow axis of the lower-side phase plate has been set to be 29.

As is apparent from FIG. 10, first and second highest contrast ratios have been obtained at 30° and 28° which are the nearest to 29°, and the contrast ratio is decreased as the angle moves away from 29°. Also, focusing attention on 30:1, i.e., the first target of the contrast ratio, a contrast ratio higher than 30:1 has been obtained in the range of 29°±2°. Focusing attention on 15:1, i.e., the second target, a contrast ratio higher than 15:1 has been obtained in the range of 29°±5°.

Consequently, it has been found that the angle formed between the transmission axis of the lower-side polarizer and the slow axis of the lower-side phase plate should fall, desirably, in the range of ±5° with the value given by the equation (2) as the center, and more desirably, in the range of ±3° with the value given by the equation (2) as the center.

7th Embodiment

In the liquid crystal display apparatus illustrated in the 1st Embodiment, the lower-side phase plate has been configured with two sheets of phase plates. The two sheets of phase plates are referred to as a first lower-side phase plate and a second lower-side phase plate from the one nearer to the second substrate. The retardations and the slow axis azimuthal angles of the respective phase plates have been determined in the following way: Namely, the irradiation with white light is performed from the upper-side polarizer side in a state where no voltage is applied to the reflection display unit liquid crystal layer and the layer-gap unit liquid crystal layer, and the polarization state of the light having passed through the upper-side phase plate, the reflection display unit liquid crystal layer, and the layer-gap unit liquid crystal layer has been measured at a plurality of wavelengths in the visible wavelength range. The measured polarized lights have been estimated on the Poincaré sphere projected onto the (S1, S2) plane. The first lower-side phase plate has converted the polarized lights at the respective wavelengths so that the polarized lights will be distributed in a straight line-like manner on the Poincaré sphere projected onto the (S1, S2) plane. At this time, the optical rotatory that the reflection display unit liquid crystal layer and the layer-gap unit liquid crystal layer have is compensated, and only the wavelength dispersion remains which has been caused by the birefringence. Next, the second lower-side phase plate has converted the lights that had passed through the first lower-side phase plate so that the lights will be concentrated on a single point on a sectional line with the (S1, S2) plane. At this time, the transmission lights at the respective wavelengths are converted into linearly-polarized lights the oscillation directions of which are identical to each other. By locating the lower-side polarization plate in such a manner that the absorption axis thereof becomes parallel to the oscillation directions, it becomes possible to absorb the linearly-polarized lights.

Figure 18:
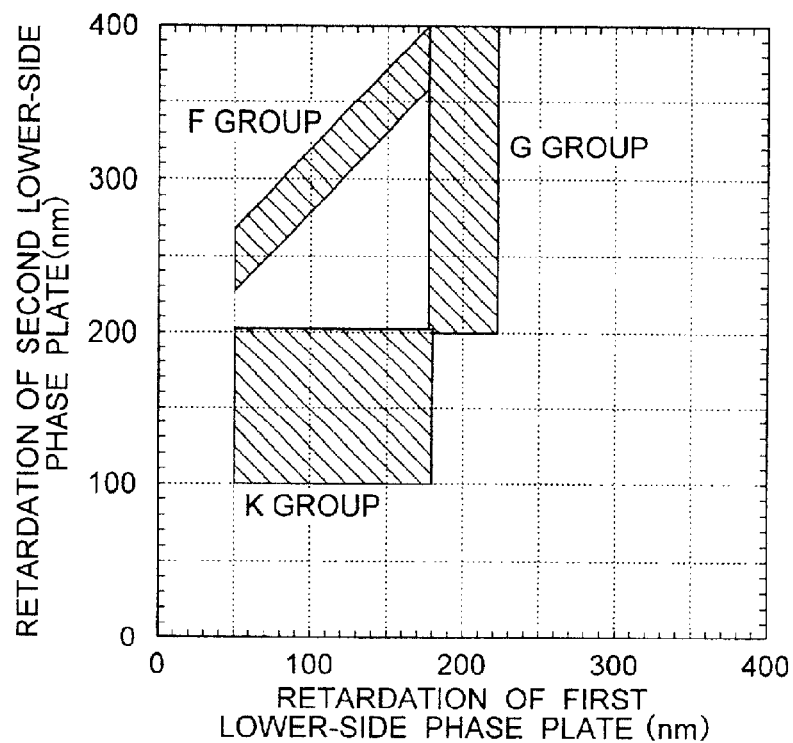
FIG. 18 is a diagram for illustrating the relationship between the retardation of a first lower-side phase plate and the retardation of a second lower-side phase plate.

FIG. 18 illustrates the retardation of the first lower-side phase plate and that of the second lower-side phase plate which have been determined as explained above. The solutions are classified into three groups, which are referred to as F group, G group, and K group, respectively. In F group, the retardation of the second lower-side phase plate is larger than that of the first lower-side phase plate by the amount of approximately 180 nm to 220 nm, and the retardation of the first lower-side phase plate is distributed in the range of 50 nm to 180 nm. In G group, the retardation of the first lower-side phase plate is narrow in its distribution range, and is distributed in the range of 180 nm to 220 nm. In contrast to this, the retardation of the second lower-side phase plate is wide in its distribution range, and is distributed in the range of 200 nm to 400 nm. In K group, the retardation of the first lower-side phase plate is distributed in the range of 50 nm to 180 nm, and the retardation of the second lower-side phase plate is distributed in the range of 100 nm to 200 nm.

Of the solutions of these groups, the solution of F group has been selected in the present embodiment. The setting has been performed as follows: The retardation of the first lower-side phase plate is 140 nm, the slow axis azimuthal angle of the first lower-side phase plate is 148°, the retardation of the second lower-side phase plate is 340 nm, the slow axis azimuthal angle of the second lower-side phase plate is 38°, and the absorption axis azimuthal angle of the lower-side polarization plate is 48°.

Having measured the contrast ratio on the transmission display, the contrast ratio has been found to be 41:1. By executing the phase difference compensation of the transmission lights more precisely using the two sheets of lower-side phase plates, it has become possible to increase the contrast ratio on the transmission display largely than that in the 1st Embodiment.

Figure 19:
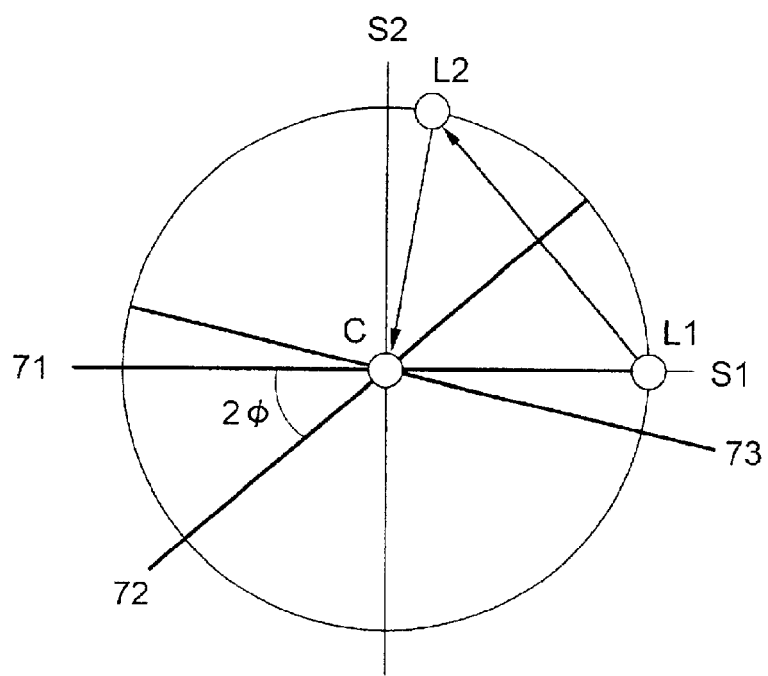
FIG. 19 is a diagram for illustrating the principle of a circular polarization plate with a broad-band.

The combination of the lower-side phase plate and the lower-side polarizer in the present embodiment is an elliptical polarization plate with a broad-band, thus providing elliptically-polarized lights that are identical to each other over a broader wavelength range. A multilayered combination of a quarter wavelength plate, a half wavelength plate, and a polarizer has been known as a circular polarization plate with a broad-band, and the elliptical polarization plate in the present embodiment also has an operation similar thereto. FIG. 19 illustrates the principle of the broad-band circular polarization plate. FIG. 19 illustrates a Poincaré sphere projected onto the (S1, S2) plane, where the circle's center and its circumference correspond to a circularly-polarized light and a linearly-polarized light, respectively. A linearly-polarized light L1 having passed through the polarization plate is once converted into a linearly-polarized light L2 by the half wavelength plate (which corresponds to the second phase plate), then being converted into a circularly-polarized light C by the one-fourth wavelength plate (which corresponds to the first phase plate). The half wavelength plate and the quarter wavelength plate cause the transmission polarized light to perform a movement close to a reciprocating movement. As a result, the wavelength dispersion of the phase difference that the half wavelength plate and the quarter wavelength plate have in between is satisfactorily compensated, thereby making it possible to obtain circularly-polarized lights over a broader wavelength band. Assuming that, in FIG. 19, an angle formed between the slow axis of the half wavelength plate and the transmission axis of the polarizer is equal to $2\pi$, an angle formed between the slow axis of the quarter wavelength plate and the transmission axis of the polarizer is determined to be $4\phi+90°$. In the real space, the angles become equal to $\phi°$ and $2\phi+45°$, respectively.

Figure 20:
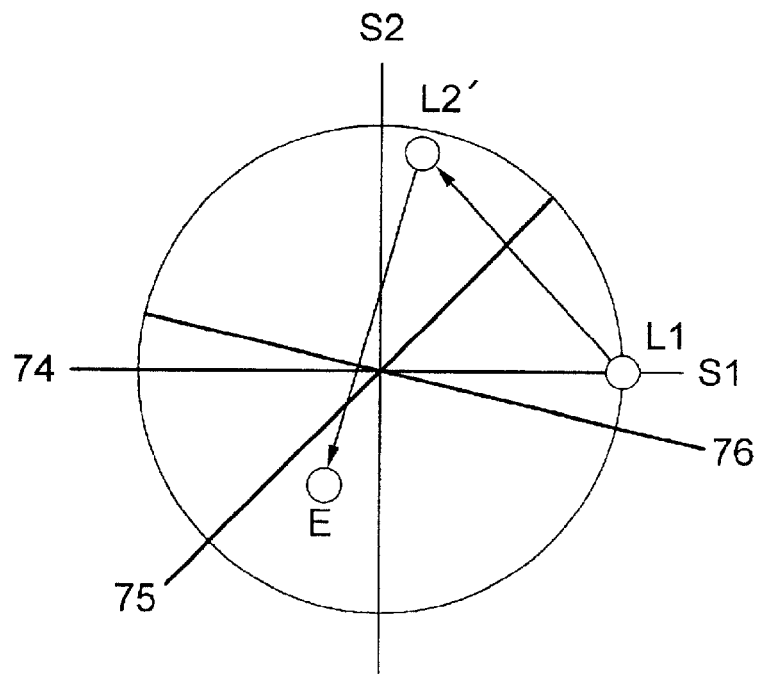
FIG. 20 is a diagram for illustrating the principle of an elliptical polarization plate with a broad-band.

The elliptical polarization plate in the present embodiment also concentrates the lights at the respective wavelengths onto a single point on the Poincaré sphere corresponding to an elliptically-polarized light. Consequently, as illustrated in FIG. 20, the elliptical polarization plate performs a conversion similar to that of the broad-band circular polarization plate. Namely, similarly to the half wavelength plate, the second lower-side phase plate moves a transmission light L1 to a point L2' in proximity to a linearly-polarized light. Then, similarly to the quarter wavelength plate, the first lower-side phase plate moves this light to a point E on the Poincaré sphere corresponding to an elliptically-polarized light. As is apparent from FIG. 18, the retardation of the second lower-side phase plate is distributed in proximity to the half wavelength (i.e., about 275 nm), and the retardation of the first lower-side phase plate is distributed in proximity to the quarter wavelength (i.e., about 137 nm). Concerning an angle formed between the slow axis of the second lower-side phase plate and the absorption axis of the lower-side polarizer, and an angle formed between the slow axis of the first lower-side phase plate and the absorption axis of the lower-side polarizer, there exists a tendency similar to that of the broad-band circular polarizer. Assuming that an angle formed between the slow axis of the second lower-side phase plate and the transmission axis of the lower-side polarizer is equal to $\phi$, an angle formed between the slow axis of the first lower-side phase plate and the transmission axis of the lower-side polarizer falls in the range of $2\phi+35°$ to $2\phi+55°$.

8th Embodiment

In the reflection-type liquid crystal display apparatus illustrated in the 1st Embodiment, the twist angle has been set to be 65°. Also, the upper-side phase plate has been configured with a first upper-side phase plate and a second upper-side phase plate. The retardation and the slow axis azimuthal anlge of the first upper-side phase plate have been set to be 310 nm and 18°, respectively. Also, the retardation and the slow axis azimuthal angle of the second upper-side phase plate have been set to be 140 nm and 126°, respectively. The absorption axis angle of the upper-side polarizer has been set to be 178°. Here, the first upper-side phase plate and the second upper-side phase plate are referred to in sequence from the one nearer to the upper-side polarizer.

The retardation and the slow axis azimuthal angle of the first upper-side phase plate and those of the second upper-side phase plate have been determined in much the same way as in the 1st Embodiment. Namely, presuming that the transmission light passes through in the direction from the liquid crystal layer side to the polarizers and the phase plates, and assuming that the polarization state of the transmission light at a point-in-time of immediately before incident into the liquid crystal layer had been a circularly-polarized light, the polarization state of the transmission light after having passed through the liquid crystal layer has been calculated. The twist angle of the liquid crystal layer has been assumed to be in the range of 50° to 100°. The retardation and the slow axis azimuthal angle of the first upper-side phase plate and those of the second upper-side phase plate have been determined so that the transmission light at this time will be converted into linearly-polarized lights in a wide visible wavelength band. The configuration of the upper-side phase plate with the two sheets of phase plates compensates, more strictly, the birefringence property and the optical rotatory power that the liquid crystal layer has. This further makes it possible to obtain a particularly high contrast ratio when the light has been mainly launched in the board's normal direction.

Figure 21:
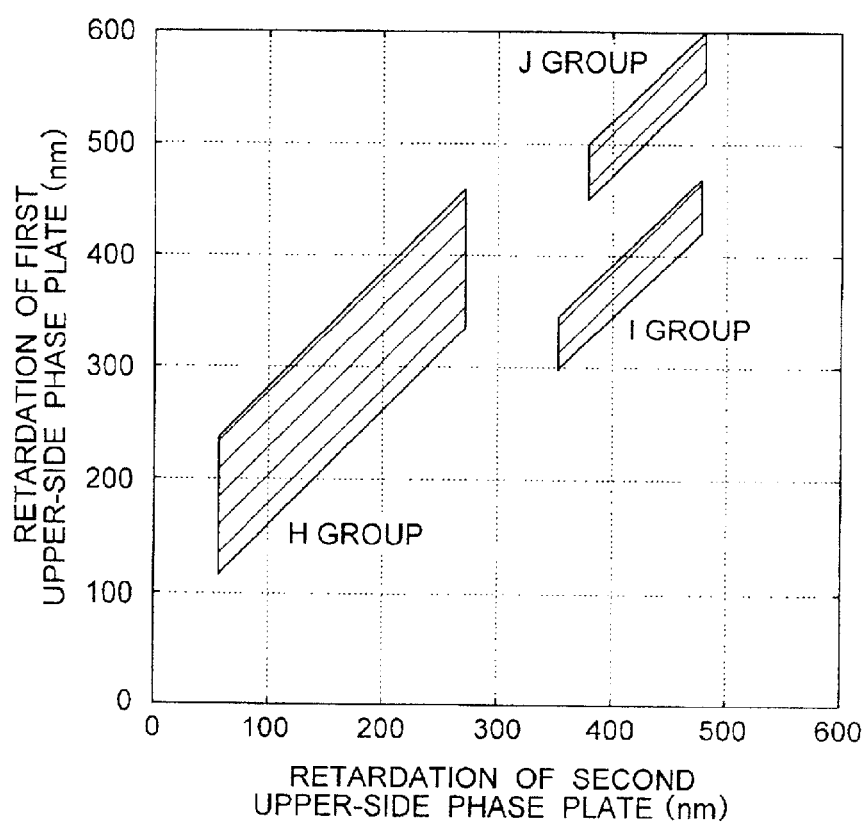
FIG. 21 is a diagram for illustrating the relationship between the retardation of a first upper-side phase plate and the retardation of a second upper-side phase plate.

FIG. 21 illustrates the relationship between the retardation of the first upper-side phase plate and that of the second upper-side phase plate which have been determined as explained above. The retardation of the first upper-side phase plate and that of the second upper-side phase plate have been distributed in a state of being divided into three groups, which will be referred to as H group, I group, and J group, respectively. In H group, the retardation of the second upper-side phase plate is distributed in the range of 50 nm to 280 nm. Moreover, the retardation of the first upper-side phase plate is larger than that of the second upper-side phase plate, and the difference therebetween falls in the range of 70 nm to 190 nm. In I group, the retardation of the second upper-side phase plate is distributed in the range of 350 nm to 480 nm. Moreover, the retardation of the second upper-side phase plate is larger than that of the first upper-side phase plate, and the difference therebetween falls in the range of 10 nm to 50 nm. In J group, the retardation of the second upper-side phase plate is distributed in the range of 380 nm to 480 nm. Moreover, the retardation of the first upper-side phase plate is larger than that of the second upper-side phase plate, and the difference therebetween falls in the range of 80 nm to 120 nm. In the present embodiment, the solution of I group has been selected.

Also, the lower-side phase plate has been configured with two sheets of phase plates and, from the solution of F group in FIG. 18, the retardation of a first lower-side phase plate and that of a second lower-side phase plate have been selected as follows: Namely, the retardation of the first lower-side phase plate is 140 nm, the slow axis azimuthal angle of the first lower-side phase plate is 148°, the retardation of the second lower-side phase plate is 340 nm, the slow axis azimuthal angle of the second lower-side phase plate is 38°, and the absorption axis azimuthal angle of the lower-side polarizer is 48°.

The display characteristic of the reflection display by the liquid crystal display apparatus created in this way has been estimated. Using an integration sphere light-source, the light irradiation is equally performed toward a sample from within an viewing angle range of 45° with the normal direction employed as the center. Having measured the luminance in this state from the normal direction, the contrast ratio has been found to be 26:1. Setting the light irradiation angle of the integration sphere light-source to be less than 15° has enhanced the contrast ratio up to 36:1. In this way, by compensating the normal direction phase difference more precisely employing the two sheets of upper-side phase plates, it has become possible to enhance the contrast ratio on the reflection display especially when the light irradiation angle has been focused.

9th Embodiment

In the reflection-type liquid crystal display apparatus illustrated in the 1st Embodiment, the twist angle has been set to be 80°. Also, the upper-side phase plate has been configured with a first upper-side phase plate and a second upper-side phase plate and, from the solution of H group in FIG. 21, the retardations thereof have been selected as follows: Namely, the retardation of the first upper-side phase plate is 290 nm, the slow axis azimuthal angle thereof is 10°, the retardation of the second upper-side phase plate is 140 nm, the slow axis azimuthal angle thereof is 120°, and the absorption axis azimuth-angle of the upper-side polarizer is 176°.

Also, the lower-side phase plate has been configured with two sheets of phase plates and, from the solution of F group in FIG. 18, the retardations of a first lower-side phase plate and a second lower-side phase plate have been selected as follows: Namely, the retardation of the first lower-side phase plate is 140 nm, the slow axis azimuthal angle thereof is 150°, the retardation of the second lower-side phase plate is 340 nm, the slow axis azimuthal angle thereof is 30°, and the absorption axis azimuth-angle of the lower-side polarizer is 50°.

Having set the light irradiation angle of the integration sphere light-source to be 45°, the contrast ratio has been found to be 28:1. Setting the light irradiation angle to be less than 15° has enhanced the contrast ratio up to 34:1. In this way, by compensating the normal direction phase difference more precisely employing the two sheets of upper-side phase plates, it has become possible to enhance the contrast ratio on the reflection display especially when the light irradiation angle has been focused.

10th Embodiment

In the reflection-type liquid crystal display apparatus illustrated in the 1st Embodiment, the twist angle has been set to be 80°. Also, from the solution of D group in FIG. 12, the retardation of the upper-side phase plate has been set to be 340 nm, and the slow axis azimuthal angle thereof has been set to be 90°. The absorption axis azimuthal angle of the upper-side polarizer has been set to be 9°. Also, the lower-side phase plate has been configured with two sheets of phase plates and, from the solution of F group in FIG. 18, the retardations of a first lower-side phase plate and a second lower-side phase plate have been selected as follows: The retardation of the first lower-side phase plate is 140 nm, the slow axis azimuthal angle thereof is 150°, the retardation of the second lower-side phase plate is 340 nm, the slow axis azimuthal angle thereof is 30°, and the absorption axis azimuthal angle of the lower-side polarizer is 50°. In this case as well, the normally-closed type display characteristic has been obtained where both the reflection display and the transmission display become the dark display at the time of no voltage application.

Figure 22:
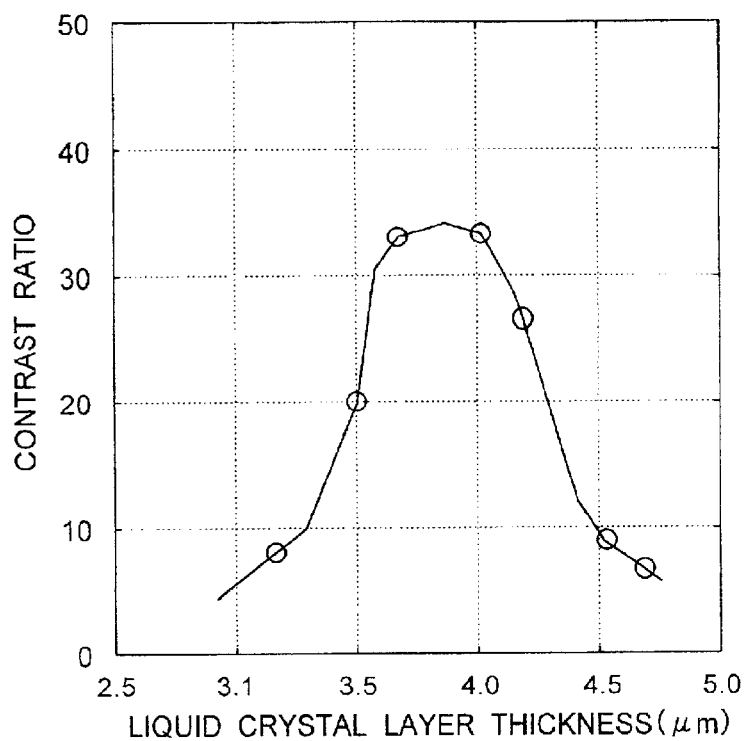
FIG. 22 is a diagram for illustrating the dependence of a contrast ratio on the liquid crystal layer thickness.

Also, liquid crystal cells whose liquid crystal layer thickness is 3.2 $\mu$m, 3.5 $\mu$m, 4.2 $\mu$m, 4.5 $\mu$m, and 4.7 $\mu$m are made, and the liquid crystal cells are combined with the lower-side phase plate, the lower-side polarizer, the upper-side phase plate, and the upper-side polarizer which satisfy the above-described condition. Contrast ratio on the reflection display are measured and the results are shown in FIG. 22. The contrast ratio of 30:1 or larger, i.e., a first target, has been obtained in the range of 3.6 μm to 4.2 μm. Also, the contrast ratio of 15:1 or larger, i.e., a second target, has been obtained in the range of 3.3 μm to 4.3 μm. By increasing the twist angle up to 80°, the liquid crystal layer thickness range in which the contrast ratio of 30:1 or larger is obtained has become equal to 0.6 μm, and the liquid crystal layer thickness range in which the contrast ratio of 15:1 or larger is obtained has become equal to 1.0 μm.

11th Embodiment

In the reflection-type liquid crystal display apparatus illustrated in the 1st Embodiment, the twist angle has been set to be 90°. Also, from the solution of E group in FIG. 12, the retardation of the upper-side phase plate has been set to be 140 nm, and the slow axis azimuthal angle thereof has been set to be 115°. The absorption axis azimuthal angle of the upper-side polarizer has been set to be 14°. The lower-side phase plate has been configured with a first lower-side phase plate and a second lower-side phase plate and, from the solution of K group in FIG. 18, the retardations thereof have been selected as follows: The retardation of the first lower-side phase plate is 140 nm, the slow axis azimuthal angle thereof is 0°, the retardation of the second lower-side phase plate is 140 nm, and the slow axis azimuthal angle thereof is 49°. The absorption axis azimuthal angle of the lower-side polarizer has been set to be 130°. In this case as well, the normally-closed type display characteristic has been obtained where both the reflection display and the transmission display become the dark display at the time of no voltage application.

Figure 23:
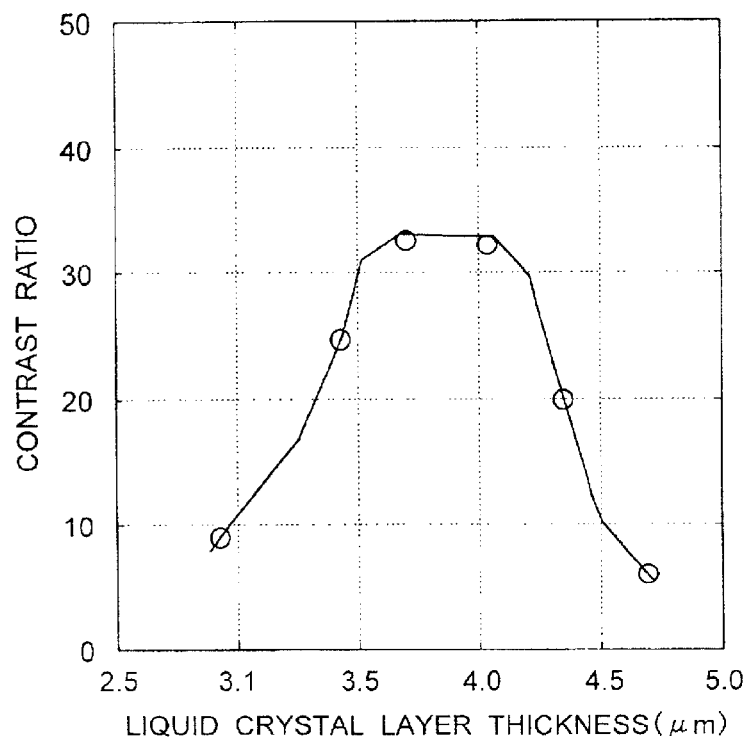
FIG. 23 is a diagram for illustrating the dependence of a contrast ratio on the liquid crystal layer thickness.

Also, liquid crystal cells whose liquid crystal layer thickness is 2.9 μm, 3.4 μm, 3.7 μm, 4.3 μm, and 4.7 μm are made, the liquid crystal cells are combined with the lower-side phase plate, the lower-side polarizer, the upper-side phase plate, and the upper-side polarizer which satisfy the above-described condition. Contrast ratio on the reflection display are measured and the results are shown in FIG. 23. The contrast ratio of 30:1 or larger, i.e., a first target, has been obtained in the range of 3.5 μm to 4.2 μm. Also, the contrast ratio of 15:1 or larger, i.e., a second target, has been obtained in the range of 3.2 μm to 4.4 μm. By increasing the twist angle up to 90°, the liquid crystal layer thickness range in which the contrast ratio of 30:1 or larger is obtained has been expanded to 0.7 μm, and the liquid crystal layer thickness range in which the contrast ratio of 15:1 or larger is obtained has been expanded to 1.2 μm.

1st Comparative Example

In the liquid crystal display apparatus illustrated in the 1st Embodiment, the angle formed between the transmission axis of the lower-side polarizer 34 and the slow axis of the lower-side phase plate 32 has been set to be 45°. In this case, at the point-in-time when the backlight light has passed through the lower-side polarizer and the lower-side phase plate, a circularly-polarized light is obtained. Having estimated the display characteristic of the transmission display from the normal direction in this state, the contrast ratio has been decreased down to 8:1.

Namely, in the case of the liquid crystal display apparatus where there exists the layer-gap between the reflection display unit and the transmission display unit, taking into consideration the phase difference that the liquid crystal layer's portion corresponding to the layer-gap adds to the backlight light, the transmission axis of the lower-side polarizer and the slow axis of the lower-side phase plate are set so that the backlight light has become the circularly-polarized light at the point-in-time when the backlight light has passed through the liquid crystal layer's portion corresponding to the layer-gap. Without this setting, the contrast ratio on the transmission display would be decreased.

2nd Comparative Example

In the liquid crystal display apparatus illustrated in the 2nd Embodiment, the angle formed between the transmission axis of the lower-side polarizer and the slow axis of the lower-side phase plate has been set to be 45°. Having estimated the display characteristic of the transmission display from the normal direction, the contrast ratio has been decreased down to 6:1. If the phase difference that the liquid crystal layer's portion corresponding to the layer-gap adds to the backlight light were not taken into consideration, the contrast ratio on the transmission display would be decreased.

As having been explained so far, the liquid crystal display apparatus according to the embodiments of the present invention allows the excellent contrast ratio display to be obtained in the combination with the diffusion reflection electrode. As a result, mounting the display apparatus on a portable-type information device or the like makes it possible to enlarge its usage range even further.

As having been explained so far, the embodiments of the present invention permit the excellent displays to be obtained on both the reflection display and the transmission display.

What is claimed is:

1. A liquid crystal display apparatus, comprising:

a pair of opposed and facing substrates, a liquid crystal layer and a liquid crystal driving unit which are held in being sandwiched between said facing substrates, said liquid crystal layer having a twist angle which falls in a range of 40° to 70°, and polarizer and phase plates which are located on an upper side and on a lower side of said facing substrates, respectively, wherein a pixel of said liquid crystal display apparatus includes a reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer.

2. The liquid crystal display apparatus as claimed in claim 1, wherein said lower-side phase plate includes a first lower-side phase plate and a second lower-side phase plate, a retardation of said first lower-side phase plate falling in a range of 180 nm to 220 nm, a retardation of said second lower-side phase plate falling in a range of 200 nm to 400 nm.

3. The liquid crystal display apparatus as claimed in claim 1, wherein said lower-side phase plate includes a first lower-side phase plate and a second lower-side phase plate, a retardation of said second lower-side phase plate being larger than that of said first lower-side phase plate, and a difference therebetween falling in a range of 180 nm to 220 nm, said retardation of said first lower-side phase plate falling in a range of 50 nm to 180 nm.

4. The liquid crystal display apparatus as claimed in claim 1, wherein said lower-side phase plate includes a first lower-side phase plate and a second lower-side phase plate, a retardation of said first lower-side phase plate falling in a range of 50 nm to 180 nm, a retardation of said second lower-side phase plate falling in a range of 100 nm to 200 nm.

5. The liquid crystal display apparatus, comprising:

a pair of opposed and facing substrates, a liquid crystal layer and a liquid crystal driving unit which are held in being sandwiched between said facing substrates, and polarizer and phase plates which are located on an upper side and on a lower side of said facing substrates, respectively, wherein a pixel of said liquid crystal display apparatus includes reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer, wherein, when a layer-gap between said transmission display unit and said reflection display unit is set to be d, an effective birefringence of a liquid crystal material is set to be $\Delta n$, and a wavelength of a transmission light is set to be $\lambda$, an angle $\theta$ formed between a slow axis of said lower-side phase plate and a transmission axis of said lower-side polarizer falls in a range of $40°-180°×\Delta nd/\lambda<\theta<50°-180°×\Delta nd/\lambda$.

6. The liquid crystal display apparatus, comprising:

a pair of opposed and facing substrates, a liquid crystal layer and a liquid crystal driving unit which are held in being sandwiched between said facing substrates, and polarizer and phase plates which are located on an upper side and on a lower side of said facing substrates, respectively, wherein a pixel of said liquid crystal display apparatus includes a reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer, wherein, when a layer-gap between said transmission display unit and said reflection display unit is set to be d, an effective birefringence of a liquid crystal material is set to be $\Delta n$, and a wavelength of a transmission light is set to be $\lambda$, an angle $\theta$ formed between a slow axis of said lower-side phase plate and a transmission axis of said lower-side polarizer falls in a range of $43°-180°×\Delta nd/\lambda<\theta<47°-180°×\Delta nd/\lambda$.

7. The liquid crystal display apparatus, comprising:

a pair of opposed and facing substrates, a liquid crystal layer and a liquid crystal driving unit which are held in being sandwiched between said facing substrates, and polarizer and phase plates which are located on an upper side and on a lower side of said facing substrates, respectively, wherein a pixel of said liquid crystal display apparatus includes a reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer, wherein a twist angle of said liquid crystal layer falls in a range of 40° to 70°, a retardation of said liquid crystal layer falling in a range of 200 nm to 350 nm, a retardation of said upper-side phase plate falling in a range of 280 nm to 470 nm, a retarded-phase axis azimuth-angle of said upper-side phase plate falling in a range of 30° to 75°, an absorption axis azimuth-angle of said upper-side polarization plate falling in a range of 30° to 90°.

8. The liquid crystal display apparatus, comprising:

a pair of opposed and facing substrates, a liquid crystal layer and a liquid crystal driving unit which are held in being sandwiched between said facing substrates, and polarizer and phase plates which are located on an upper side and on a lower side of said facing substrates, respectively, wherein a pixel of said liquid crystal display apparatus includes a reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer, wherein a twist angle of said liquid crystal layer falls in a range of 75° to 85°,, a retardation of said liquid crystal layer falling in a range of 200 nm to 310 nm, a retardation of said phase plates falling in a range of 320 nm to 460 nm, a slow axis azimuthal angle of said phase plates falling in a range of 105° to 145°, an absorption axis azimuthal angle of said polarization plates falling in a range of 25° to 65°.

9. The liquid crystal display apparatus, comprising:

a pair of opposed and facing substrates, a liquid crystal layer and a liquid crystal driving unit which are held in being sandwiched between said facing substrates, and polarizer and phase plates which are located on an upper side and on a lower side of said facing substrates, respectively, wherein a pixel of said liquid crystal display apparatus includes a reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer, wherein a twist angle of said liquid crystal layer falls in a range of 50° to 100°, said upper-side phase plate including a first upper-side phase plate and a second upper-side phase plate, a retardation of said second upper-side phase plate falling in a range of 50 nm to 280 nm, a retardation of said first upper-side phase plate being larger than that of said second upper-side phase plate, and a difference therebetween falling in a range of 70 nm to 190 nm.

10. The liquid crystal display apparatus, comprising:

a pair of opposed and facing substrates, a liquid crystal layer and a liquid crystal driving unit which are held in being sandwiched between said facing substrates, and polarizer and phase plates which are located on an upper side and on a lower side of said facing substrates, respectively, wherein a pixel of said liquid crystal display apparatus includes a reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer, wherein a twist angle of said liquid crystal layer falls in a range of 50° to 100°, said upper-side phase plate including a first upper-side phase plate and a second upper-side phase plate, a retardation of said second upper-side phase plate falling in a range of 350 nm to 480 nm, a retardation of said second upper-side phase plate being larger than that of said first upper-side phase plate, and a difference therebetween falling in a range of 10 nm to 50 nm.

11. The liquid crystal display apparatus, comprising:

a pair of opposed and facing substrates, a liquid crystal layer and a liquid crystal driving unit which are held in being sandwiched between said facing substrates, and polarizer and phase plates which are located on an upper side and on a lower side of said facing substrates, respectively, wherein a pixel of said liquid crystal display apparatus includes a reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer, wherein a twist angle of said liquid crystal layer falls in a range of 50° to 100°, said upper-side phase plate including a first upper-side phase plate and a second upper-side phase plate, a retardation of said second upper-side phase plate falling in a range of 380 nm to 480 nm, a retardation of said first upper-side phase plate being larger than that of said second upper-side phase plate, and a difference therebetween falling in a range of 80 nm to 120 nm.

12. The liquid crystal display apparatus, comprising:

a pair of opposed and facing substrates, a liquid crystal layer and a liquid crystal driving unit which are held in being sandwiched between said facing substrates, and polarizer and phase plates which are located on an upper side and on a lower side of said facing substrates, respectively, wherein a pixel of said liquid crystal display apparatus includes reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer, wherein said lower-side phase plate includes a first lower-side phase plate and a second lower-side phase plate, a retardation of said first lower-side phase plate falling in a range of 180 nm to 220 nm, a retardation of said second lower-side phase plate falling in a range of 200 nm to 400 nm, and wherein, when an angle formed between a slow axis of said second lower-side phase plate and a transmission axis of said lower-side polarizer is set to be $\phi$, an angle formed between a slow axis of said first lower-side phase plate and said transmission axis of said lower-side polarizer falls in a range of $2\phi+35°$ to $2\phi+55°$.

13. The liquid crystal display apparatus, comprising:

a pair of opposed and facing substrates, a liquid crystal layer and a liquid crystal driving unit which are held in being sandwiched between said facing substrates, and polarizer and phase plates which are located on an upper side and on a lower side of said facing substrates, respectively, wherein a pixel of said liquid crystal display apparatus includes a reflection display unit whose reflections applied voltage characteristic is a normally-closed type and a transmission display unit whose layer thickness is thicker than that of a liquid crystal layer constituting said reflection display unit, said polarizer and said phase plate located on said lower side of said facing substrates forming an elliptical polarizer, wherein said lower-side phase plate includes a first lower-side phase plate and a second lower-side phase plate, a retardation of said second lower-side phase plate being larger than that of said first lower-side phase plate, and a difference therebetween falling in a range of 180 nm to 220 nm, said retardation of said first lower-side phase plate falling in a range of 50 nm to 180 nm, and wherein, when an angle formed between a slow axis of said second lower-side phase plate and a transmission axis of said lower-side polarizer is set to be $\phi$, an angle formed between a slow axis of said first lower-side phase plate and said transmission axis of said lower-side polarizer falls in a range of $2\phi+35°$ to $2\phi+55°$.

* * * * *